US009176311B2

(12) United States Patent
Yamamoto

(10) Patent No.: US 9,176,311 B2
(45) Date of Patent: Nov. 3, 2015

(54) MICROSCOPE CONTROL DEVICE AND OPTICAL DISTORTION CORRECTION METHOD

(75) Inventor: Takashi Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 13/192,803

(22) Filed: Jul. 28, 2011

(65) Prior Publication Data

US 2012/0044340 A1 Feb. 23, 2012

(30) Foreign Application Priority Data

Aug. 18, 2010 (JP) ................................. 2010-183152

(51) Int. Cl.
*H04N 7/18* (2006.01)
*G02B 21/14* (2006.01)

(52) U.S. Cl.
CPC ....................................... *G02B 21/14* (2013.01)

(58) Field of Classification Search
CPC ......... G02B 21/14; G02B 21/00; G02B 21/22
USPC ............... 348/79; 250/201.2, 201.9; 396/234; 359/383; 356/417
See application file for complete search history.

(56) References Cited

U.S. PATENT DOCUMENTS

| | | | | |
|---|---|---|---|---|
| 5,856,664 | A * | 1/1999 | Suzuki et al. ............... | 250/201.2 |
| 6,339,499 | B1 * | 1/2002 | Shirai ........................... | 359/383 |
| 6,483,948 | B1 * | 11/2002 | Spink et al. .................... | 382/255 |
| 6,963,520 | B1 * | 11/2005 | Park et al. .................... | 369/44.11 |
| 7,825,360 | B2 * | 11/2010 | Karasawa et al. ........... | 250/201.2 |
| 2001/0006434 | A1 * | 7/2001 | Yoo et al. ....................... | 359/727 |
| 2003/0149347 | A1 * | 8/2003 | Kauffmann et al. ........... | 600/310 |
| 2004/0085517 | A1 * | 5/2004 | Togino et al. ................... | 353/31 |
| 2004/0179128 | A1 * | 9/2004 | Oikawa .......................... | 348/345 |
| 2004/0213115 | A1 * | 10/2004 | Nakata et al. ............... | 369/53.23 |
| 2005/0083531 | A1 * | 4/2005 | Millerd et al. ................. | 356/450 |
| 2005/0100245 | A1 * | 5/2005 | Chen et al. .................... | 382/294 |
| 2005/0157260 | A1 * | 7/2005 | Graham et al. ................ | 351/219 |
| 2006/0042106 | A1 * | 3/2006 | Smith et al. ..................... | 33/286 |
| 2007/0009253 | A1 * | 1/2007 | Nikkanen et al. ............. | 396/234 |
| 2007/0132998 | A1 * | 6/2007 | Tang et al. ..................... | 356/417 |
| 2007/0268592 | A1 * | 11/2007 | Kam et al. ..................... | 359/637 |
| 2008/0069438 | A1 * | 3/2008 | Winn et al. .................... | 382/160 |
| 2008/0130103 | A1 * | 6/2008 | Hara et al. ..................... | 359/369 |
| 2008/0265130 | A1 * | 10/2008 | Colomb et al. ............. | 250/201.9 |
| 2008/0308730 | A1 * | 12/2008 | Vizi et al. ....................... | 250/309 |
| 2008/0310030 | A1 * | 12/2008 | Winterot et al. ............... | 359/661 |
| 2009/0059363 | A1 * | 3/2009 | Straehle et al. ............... | 359/389 |
| 2009/0127474 | A1 * | 5/2009 | Tsuneta et al. ........... | 250/442.11 |
| 2009/0153720 | A1 * | 6/2009 | Suzuki et al. ............ | 348/333.01 |
| 2009/0257621 | A1 * | 10/2009 | Silver ............................ | 382/103 |

(Continued)

FOREIGN PATENT DOCUMENTS

JP 2003-222801 8/2003

*Primary Examiner* — Richard Torrente
*Assistant Examiner* — Joseph Suh
(74) *Attorney, Agent, or Firm* — K&L Gates LLP

(57) ABSTRACT

A microscope control device includes an offset processing unit that corrects phase contrast information regarding a phase contrast between corresponding phase contrast images, which is generated based on a set of the phase contrast images of a sample which are captured by a microscope, based on offset information of phase contrasts caused by optical distortions unique to the microscope, and a defocus amount calculation unit that calculates a defocus amount of the sample on the basis of the phase contrast information after offset correction.

16 Claims, 16 Drawing Sheets

(56) References Cited

U.S. PATENT DOCUMENTS

| | | | |
|---|---|---|---|
| 2010/0020933 A1* | 1/2010 | Topfer et al. | 378/98.11 |
| 2010/0134850 A1* | 6/2010 | Matsuzaki | 358/448 |
| 2010/0226637 A1* | 9/2010 | Kanda et al. | 396/133 |
| 2010/0265177 A1* | 10/2010 | Fujimoto et al. | 345/162 |
| 2010/0299103 A1* | 11/2010 | Yoshikawa | 702/167 |
| 2011/0058070 A1* | 3/2011 | Awazu | 348/241 |
| 2011/0069217 A1* | 3/2011 | Imada et al. | 348/345 |
| 2011/0090323 A1* | 4/2011 | Shibata | 348/54 |
| 2011/0110606 A1* | 5/2011 | Johnson et al. | 382/296 |
| 2011/0255745 A1* | 10/2011 | Hodder et al. | 382/103 |
| 2011/0262030 A1* | 10/2011 | Sahay et al. | 382/154 |
| 2011/0292199 A1* | 12/2011 | Lapstun et al. | 348/79 |
| 2011/0317259 A1* | 12/2011 | Tanabe et al. | 359/383 |
| 2012/0002031 A1* | 1/2012 | Pertsinidis et al. | 348/79 |
| 2012/0052418 A1* | 3/2012 | Tian et al. | 430/5 |
| 2013/0044028 A1* | 2/2013 | Lea et al. | 342/359 |
| 2013/0147916 A1* | 6/2013 | Bennett et al. | 348/46 |

* cited by examiner

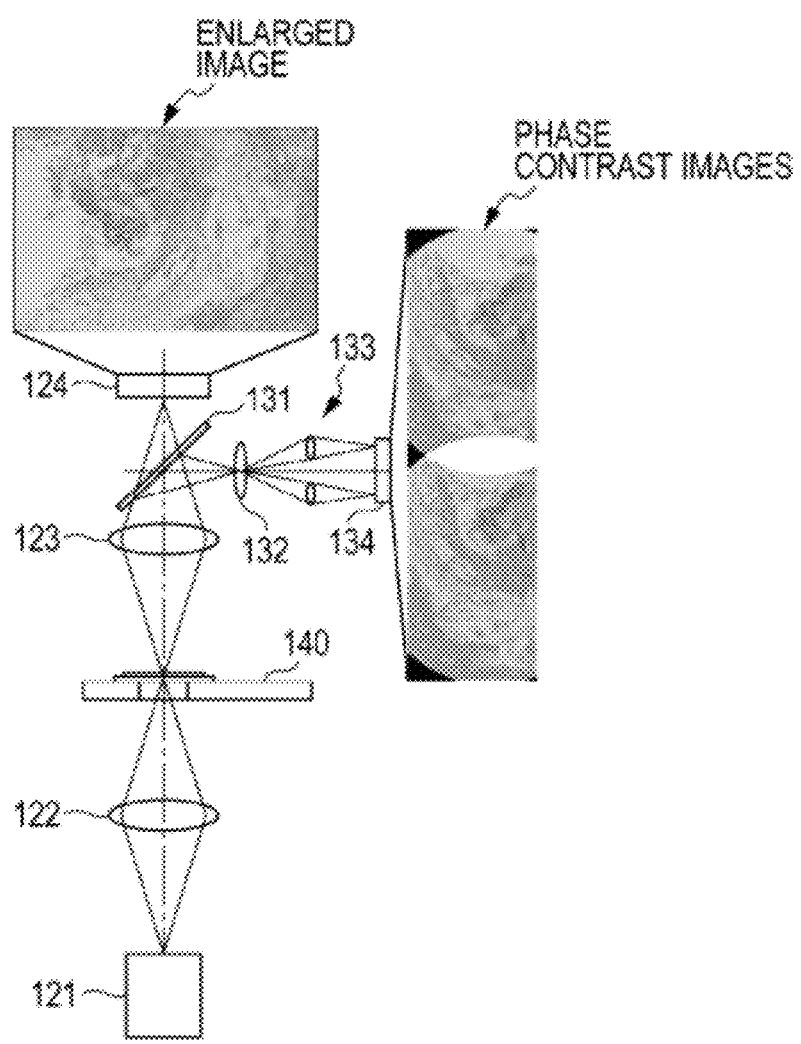

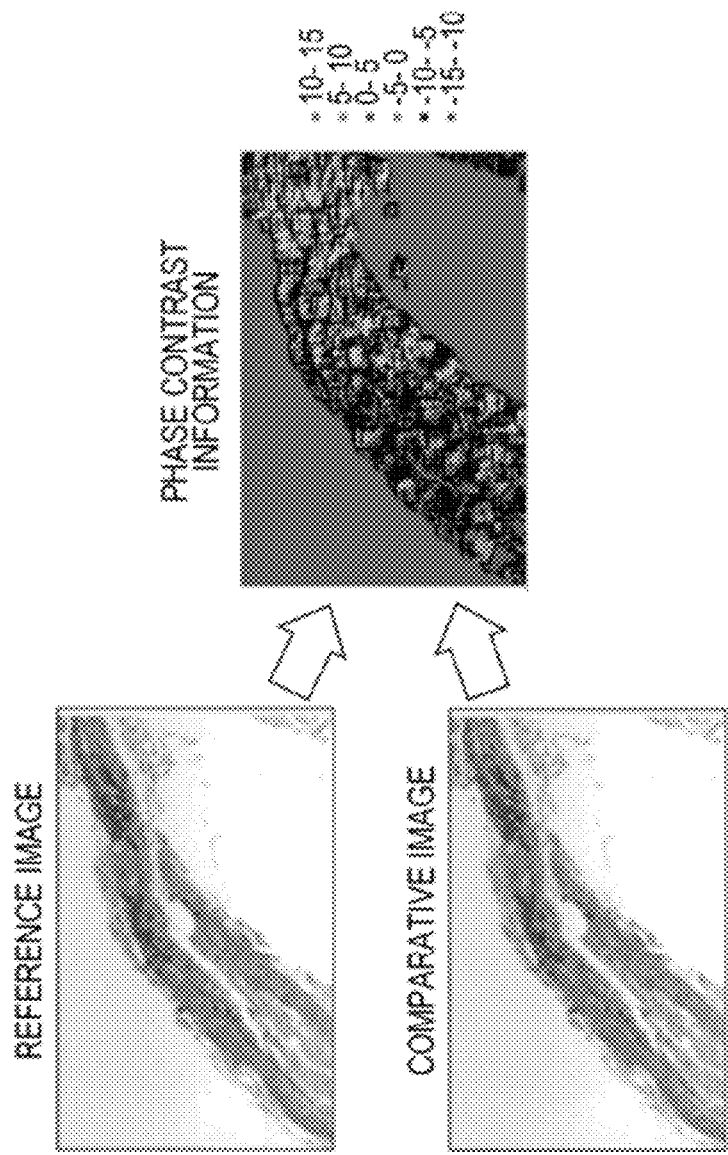

NO DISTORTION

BARREL TYPE

REEL TYPE

COMPLICATED DISTORTION

FIG. 9
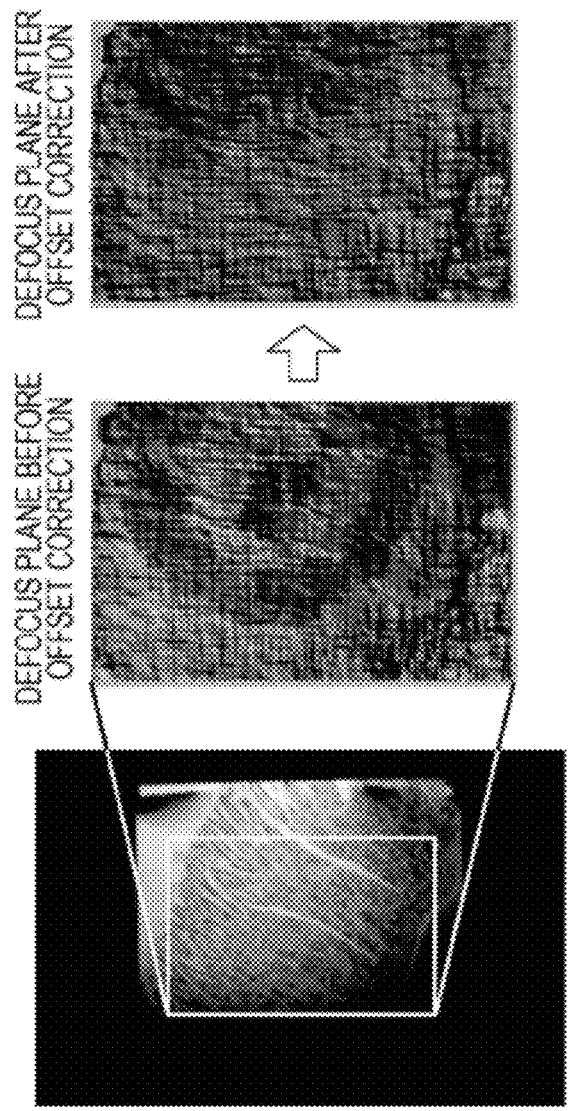
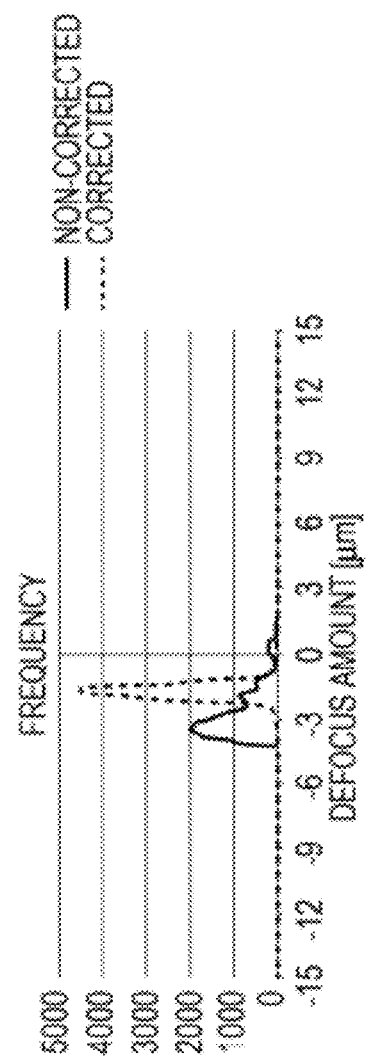

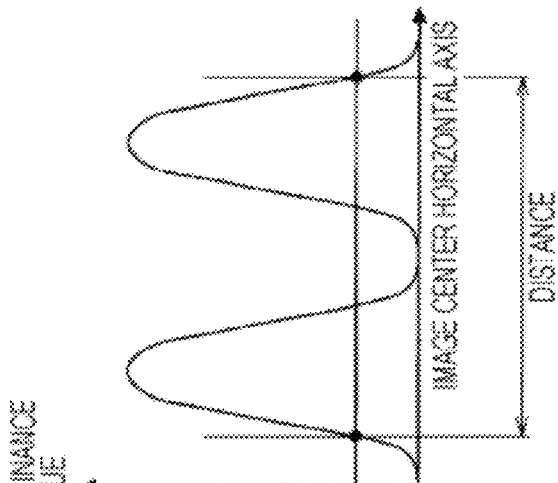
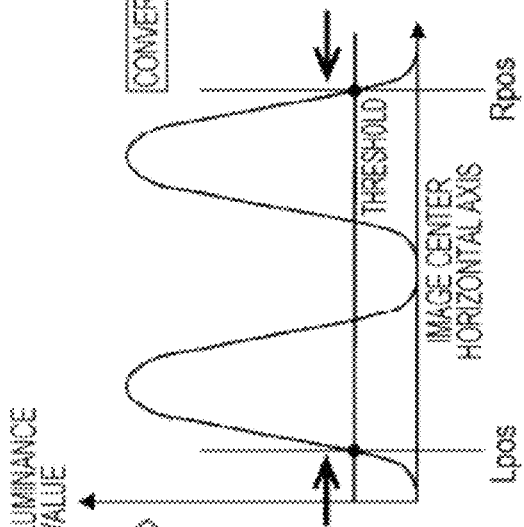
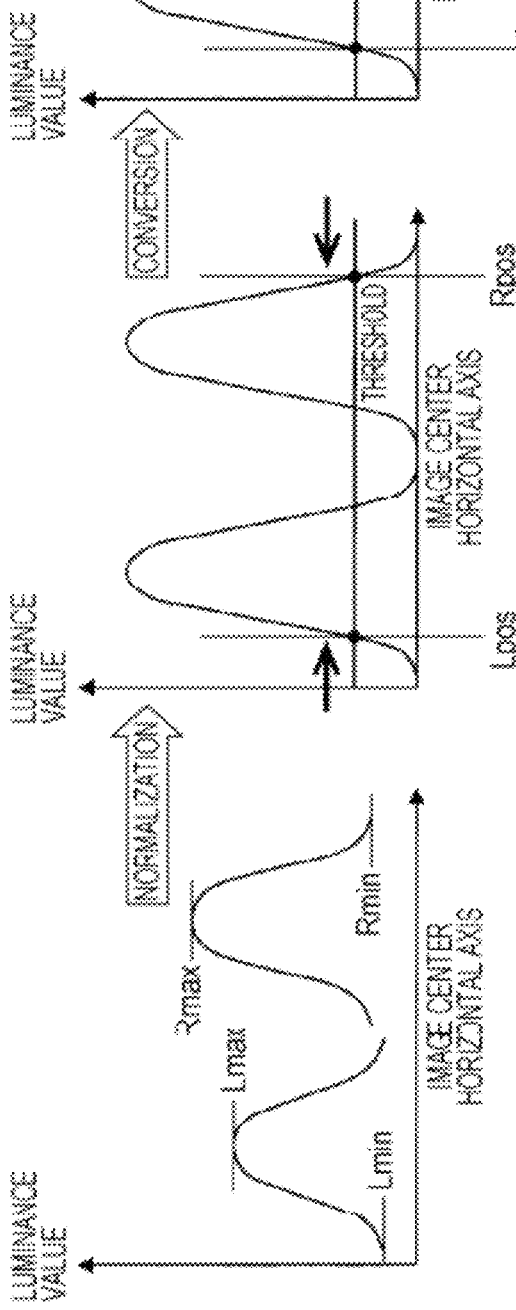

MICROSCOPE CONTROL DEVICE AND OPTICAL DISTORTION CORRECTION METHOD

CROSS REFERENCES TO RELATED APPLICATIONS

The present application claims priority to Japanese Priority Patent Application JP 2010-183152 filed in the Japan Patent Office on Aug. 18, 2010, the entire contents of which are hereby incorporated by reference.

BACKGROUND

The present application relates to a microscope control device and an optical distortion correction method.

A technique has been proposed in which, using a microscope used to observe a sample such as a cell tissue slide, an image of a sample observed by the microscope is preserved as a digital image, and the preserved digital image is observed from other devices provided on the Internet or an intranet (for example, refer to the following Japanese Unexamined Patent Application Publication No. 2003-222801). By the use of this technique, it is possible to promote advancements in so-called telepathology where a doctor in a remote location performs a pathological diagnosis using a network.

SUMMARY

However, in a case of projecting an enlarged image and a reduced image on an imaging element using a lens as in a microscope disclosed in Japanese Unexamined Patent Application Publication No. 2003-222801, distortion (distortion aberration) occurs in the image. For this reason, in a general image capturing device such as a camera, a distortion correction process is performed in which a set of individual lenses capture images of a lattice pattern in advance, and the distortion of an image is corrected using a gap between an ideal lattice point and a lattice position of an actually imaged lattice position.

However, in such a distortion correction process, since a distortion amount is estimated at each pixel position with regard to all pixels forming the image, and then a calculation for correcting the distortion is performed for each pixel, there is a problem in that a very large amount of calculation and resources is necessary.

It is desirable to provide a microscope control device and an optical distortion correction method, capable of suppressing calculation loads necessary for a distortion correction process in a defocus detection process using a phase contrast optical system.

According to an embodiment, there is provided a microscope control device including an offset processing unit that corrects phase contrast information regarding a phase contrast between corresponding phase contrast images, which is generated based on a set of the phase contrast images of a sample which are captured by a microscope, based on offset information for phase contrasts caused by optical distortions unique to the microscope; and a defocus amount calculation unit that calculates a defocus amount of the sample on the basis of the phase contrast information after offset correction.

It is preferable that an offset process by the offset processing unit is a process for subtracting the offset information from the phase contrast information.

The offset information may include reference offset information used as a reference in an offset process and a plurality of pieces of offset information set for respective defocus amounts of the sample. The offset processing unit may perform the offset process for the phase contrast information on the basis of the reference offset information, and the defocus amount calculation unit may calculate the defocus amount on the basis of the phase contrast information after offset correction based on the reference offset information. In addition, the offset processing unit may perform the offset process for the phase contrast information again by using offset information corresponding to the calculated defocus amount.

The microscope control device may further include a defocus amount correction unit that calculates the thickness of a cover glass covering the sample and corrects the defocus amount on the basis of the calculated thickness of the corresponding cover glass.

According to another embodiment, there is provided an optical distortion correction method including correcting phase contrast information regarding a phase contrast between corresponding phase contrast images, which is generated based on a set of the phase contrast images of a sample which are captured by a microscope, based on offset information of phase contrasts caused by optical distortions unique to the microscope; and calculating a defocus amount of the sample on the basis of the phase contrast information after offset correction.

As described above, according to the embodiments, it is possible to suppress calculation loads necessary for a distortion correction process in a defocus detection process using a phase contrast optical system.

Additional features and advantages are described herein, and will be apparent from the following Detailed Description and the figures.

BRIEF DESCRIPTION OF THE FIGURES

FIG. 3 is a diagram illustrating an example of an enlarged image and phase contrast images of a sample.

FIG. 4 is a diagram illustrating an example of phase contrast information generated based on the phase contrast images.

FIG. 9 is a diagram illustrating an offset correction process according to the same embodiment.

FIGS. 13A to 13C are diagrams illustrating a calculation process of the thickness of cover glass.

DETAILED DESCRIPTION

Embodiments of the present application will be described below in detail with reference to the drawings.
1. First Embodiment
 1-1. Configuration of Microscope Image Management System
 1-2. Entire Configuration of Microscope
 1-3. Entire Configuration of Microscope Control Device
 1-4. Outline of Phase contrast Calculation Process
 1-5. Configuration of Overall Control Unit
 1-6. Configuration of Distortion Correction Unit
 1-7. First Modified Example
 1-8. Optical Distortion Correction Method
2. Hardware Configuration of Microscope Control Device according to Embodiment of Present Application
3. Conclusion Hereinafter, although as a sample imaged by a microscope, a biological sample (a cell tissue sample) including a slice of tissue such as connective tissue such as blood, epithelial tissue, or both types of tissue, or smear cells is described as an example, the present application is not limited thereto.

First Embodiment

Configuration of Microscope Image Management System

Figure 1:
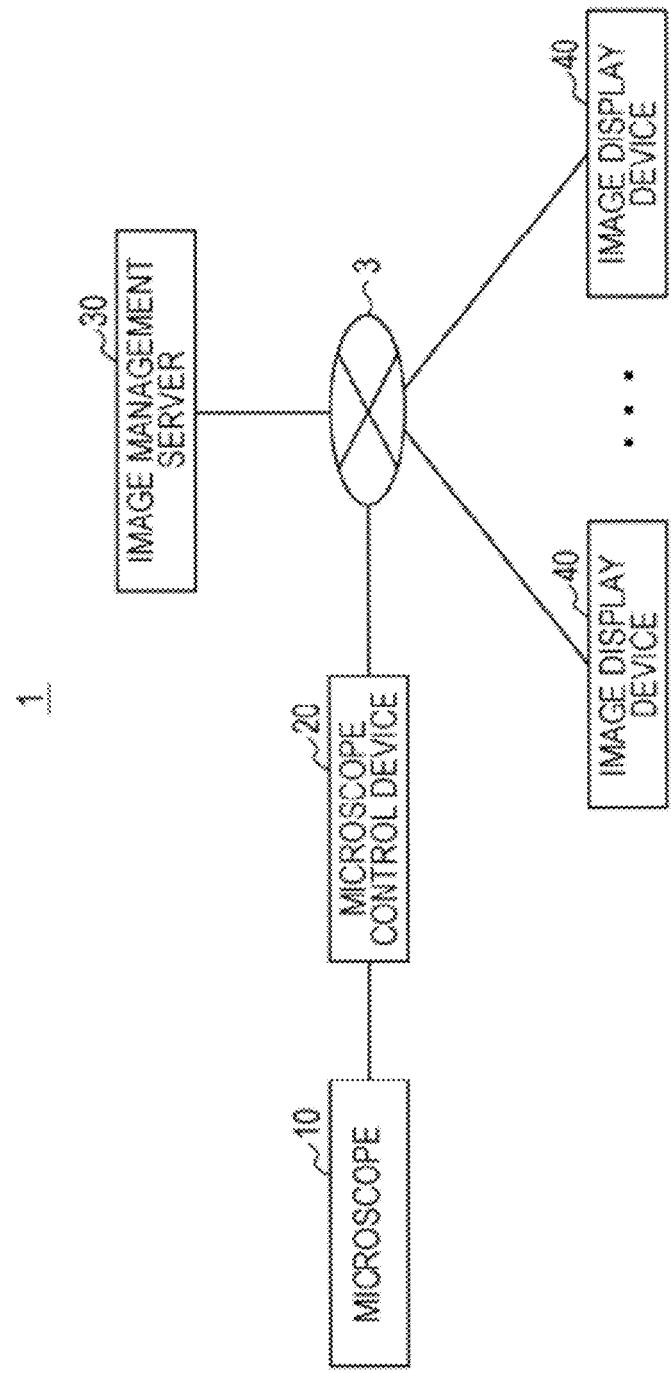
FIG. 1 is a diagram illustrating a configuration of a microscope image management system according to a first embodiment.

First, a configuration of a microscope image management system 1 according to a first embodiment will be described with reference to FIG. 1. FIG. 1 is a diagram illustrating a configuration of the microscope image management system 1 according to the embodiment.

The microscope image management system 1 according to the embodiment includes a microscope 10, a microscope control device 20, an image management server 30, and an image display device 40 as shown in FIG. 1. The microscope control device 20, the image management server 30, and the image display device 40 are connected to each other via a network 3.

The network 3 is a communication network which can connect the microscope control device 20, the image management server 30, and the image display device 40 according to the embodiment to each other so as to communicate in a bidirectional manner. The network 3 includes, for example, public networks such as the Internet, a telephone network, a satellite communication network, or a broadcast line, or a dedicated network such as WAN (Wide Area Network), LAN (Local Area Network), IP-VPN (Internet Protocol-Virtual Private Network), Ethernet (registered trademark), or wireless LAN, and includes wired or wireless networks. In addition, the network 3 may be a communication network dedicated to the microscope image management system 1 according to the embodiment.

The microscope 10 illuminates a sample (for example, a biological sample) placed on a stage of the corresponding microscope 10 with predetermined illumination light, and images light transmitted through the sample or light emitted from the sample. The entire configuration of the microscope 10 according to the embodiment will be described below again in detail.

The microscope 10 is controlled to be driven by the microscope control device 20, and a sample image captured by the microscope 10 is stored in the image management server 30 via the microscope control device 20.

The microscope control device 20 controls driving of the microscope 10 which images a sample. The microscope control device 20 controls the microscope 10 to capture a digital image of the sample and performs predetermined digital processing for the obtained digital image data for the sample. In addition, the microscope control device 20 uploads the obtained digital image data for the sample to the image management server 30.

The image management server 30 stores the digital image data for the sample which has been imaged by the microscope 10, and manages the digital image data. When the digital image data for the sample is output from the microscope control device 20, the image management server 30 stores the obtained digital image data for the sample in a predetermined storage region such that an inspector can use the digital image data. Further, the image management server 30 provides digital image data for a corresponding sample to the image display device 40 when the inspector makes a request for inspecting the digital image data for the sample from the image display device 40 (that is, a device corresponding to the viewer) which is operated by the inspector.

The image display device 40 is a terminal (that is, a device corresponding to the viewer) which is operated by an inspector who wants to inspect digital image data for a sample. The inspector who wants to inspect digital image data refers to a list of digital image data or the like stored in the image management server 30, specifies digital image data which is desired to be inspected, and requests the image management server 30 to provide the specified digital image data. When the digital image data is provided from the image management server 30, the inspector can inspect the digital image data by displaying an image corresponding thereto on a display or the like of the image display device 40.

Detailed configurations of the microscope control device 20 and the image management server 30 according to the embodiment will be described below again.

In FIG. 1, although the case where the microscope 10, the microscope control device 20, and the image management server 30 included in the system 1 respectively exist singly is shown, the number of the microscope 10, the microscope control device 20, and the image management server 30 included in the microscope image management system 1 is not limited to the example shown in FIG. 1, but may be a plurality, respectively.

Entire Configuration of Microscope

Figure 2:
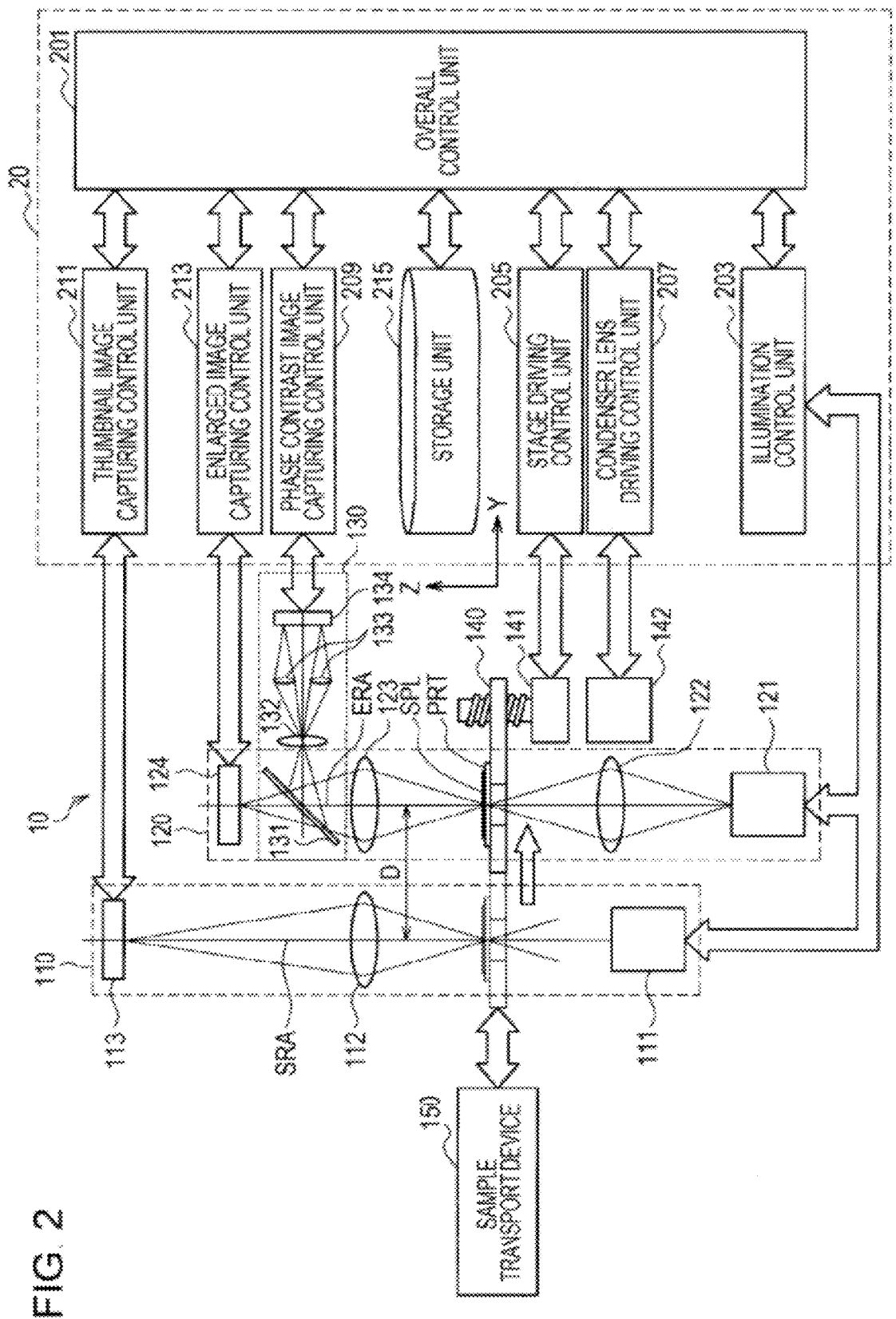
FIG. 2 is a diagram illustrating overall configurations of a microscope and a microscope control device according to the same embodiment.

Next, with reference to FIG. 2, an entire configuration of the microscope 10 according to the embodiment will be described. FIG. 2 is a diagram illustrating an entire configuration of the microscope 10 and the microscope control device 20 according to the embodiment.

Entire Configuration

The microscope 10 according to the embodiment includes, as exemplified in FIG. 2, a thumbnail image capturing unit 110 which captures an entire image of a preparation PRT (hereinafter, this image is also referred to as a thumbnail image) on which a biological sample SPL is placed, and an enlarged image capturing unit 120 which captures an image to which the biological sample SPL is enlarged at a predetermined magnification (hereinafter, this image is also referred to as an enlarged image). In addition, the enlarged image capturing unit 120 includes a defocus amount detection unit 130 for detecting a defocus amount of an illumination field stop provided in the enlarged image capturing unit 120.

The preparation PRT fixes a biological sample SPL including a slice of tissue such as connective tissue such as blood, epithelial tissue, or both types of tissue, or smear cells, to slide glass by a predetermined fixing method. This tissue slice or smear cells undergo various kinds of staining as necessary. The stains does not include only a general stain such as an HE (Hematoxylin-Eosin) stain, a Giemsa stain, or a Papanicolaou stain, but also a fluorescent stain such as FISH (Fluorescence In-Situ Hybridization) or an enzyme labeled antibody method.

Further, a label where additional information (for example, the name of a person providing a sample, the date of the provision, the kind of stain, and the like) for specifying a corresponding biological sample SPL is described may be attached to the preparation PRT.

The microscope 10 according to the embodiment is provided with a stage 140 on which the above-described preparation PRT is placed, and a stage driving mechanism 141 for moving the stage 140 in various directions. The stage 140 can be freely moved in directions (X axis direction and Y axis direction) parallel to the stage surface and in a direction perpendicular thereto (Z axis direction) by the stage driving mechanism 141.

In addition, the enlarged image capturing unit 120 is provided with a condenser lens driving mechanism 142 which is an example of an illumination field stop pint adjustment unit.

The microscope 10 according to the embodiment may be provided with a sample transport device 150 which transports the preparation PRT including the sample SPL to the stage 140. The transport device 150 can automatically place a sample which is scheduled to be imaged on the stage 140 and automatically change the samples SPL.

Thumbnail Image Capturing Unit

The thumbnail image capturing unit 110 mainly includes, as shown in FIG. 2, a light source 111, an objective lens 112, and an imaging element 113.

The light source 111 is provided at an opposite side to the surface side of the stage 140 where the preparation is disposed. The light source 111 can change between light (hereinafter, also referred to as bright field illumination light, or simply illumination light) applied to a biological sample SPL for which general staining is performed, and light (hereinafter, also referred to as dark field illumination light) applied to a biological sample SPL for which special staining is performed, for illumination. In addition, the light source 111 may apply either the bright field illumination light or the dark field illumination light. In this case, as the light source 111, two light sources are provided, that is, a light source for applying the bright field illumination light and a light source for applying the dark field illumination light.

In the thumbnail image capturing unit 110, a label light source (not shown) which applies light used to image additional information described in the label attached to the preparation PRT, may be provided separately.

The objective lens 112 having a predetermined magnification has the normal line of the reference position of the thumbnail image capturing unit 110 in the surface where the preparation is disposed as the optical axis SRA, and is installed in the surface side of the stage 140 where the preparation is disposed. Light passing through the preparation PRT installed on the stage 140 is collected at the objective lens 112, and enables an image to be formed on the imaging element 113 provided on the rear side of the objective lens 112 (that is, the traveling direction of the illumination light).

The imaging element 113 forms an image corresponding to light in an imaging range including the overall preparation PRT (in other words, light passing through the overall preparation PRT) placed on the surface of the stage 140 where the preparation is disposed. An image formed on the imaging element 113 is a thumbnail image which is a microscope image containing the overall preparation PRT.

Enlarged Image Capturing Unit

As shown in FIG. 2, the enlarged image capturing unit 120 mainly includes a light source 121, a condenser lens 122, an objective lens 123, and an imaging element 124. Further, the enlarged image capturing unit 120 is also provided with the illumination field stop (not shown).

The light source 121 applies a bright field illumination light, and is provided at an opposite side to the surface side of the stage 140 where the preparation is disposed. In addition, a light source (not shown) for applying a dark field illumination light is provided at a position (for example, the surface side where the preparation is disposed) different from the position of the light source 121.

The condenser lens 122 collects the bright field illumination light provided from the light source 121 or the dark field illumination light provided from a light source for dark field illumination and guides it to the preparation PRT on the stage 140. The condenser lens 122 has the normal line of the reference position of the enlarged image capturing unit 120 in the surface where the preparation is disposed as the optical axis ERA, and is installed between the light source 121 and the stage 140. In addition, the condenser lens driving mechanism 142 can drive the condenser lens 122 along the direction of the optical axis ERA. The condenser lens 122 can change its positions on the optical axis ERA by the condenser lens driving mechanism 142.

The objective lens 123 having a predetermined magnification has the normal line of the reference position of the enlarged image capturing unit 120 in the surface where the preparation is disposed as the optical axis ERA, and is installed in the surface side of the stage 140 where the preparation is disposed. The enlarged image capturing unit 120 can image the biological sample SPL through enlargement at various magnifications by appropriately exchanging the objective lenses 123. The light passing through the preparation PRT placed on the stage 140 is collected by the objective lens 123, and enables an image to be formed on the imaging element 124 which is provided on the rear side (that is, the traveling direction of the illumination light) of the objective lens 123.

Further, a beam splitter 131 may be provided on the optical axis ERA between the objective lens 123 and the imaging element 124. In the case where the beam splitter 131 is provided, a portion of transmitted light beams which are transmitted through the objective lens 123 are guided to the defocus amount detection unit 130 described later.

An image in an imaging range including a predetermined longitudinal width and transverse width on the surface of the stage 140 where the preparation is disposed, is formed on the imaging element 124 depending on the pixel size of the imaging element 124 and the magnification of the objective lens 123. Further, since a part of the biological sample SPL is enlarged by the objective lens 123, the above-described imaging range is sufficiently narrower than the imaging range of the imaging element 113.

Here, as shown in FIG. 2, the thumbnail image capturing unit 110 and the enlarged image capturing unit 120 are disposed to be spaced apart from each other by the distance D in the Y axis direction in terms of the optical axis SRA and the optical axis ERA which are respectively the normal lines of the reference positions. The distance D is set to be close such that a microscope tube (not shown) which holds the objective lens 123 of the enlarged image capturing unit 120 is not included in the imaging range of the imaging element 113, and further the size is minimized.

Defocus Amount Detection Unit

The defocus amount detection unit 130 mainly includes, as shown in FIG. 2, the beam splitter 131, a condenser lens 132, twin lenses 133, and an imaging element 134.

The beam splitter 131 is, as described above, provided on the optical axis ERA between the objective lens 123 and the imaging element 124 of the enlarged image capturing unit 120, and reflects a portion of transmitted light beams which are transmitted through the objective lens 123. In other words, the transmitted light beams which are transmitted through the objective lens 123 are split into light beams which travel toward the imaging element 124 and light beams which travel toward the condenser lens 132 inside the defocus amount detection unit 130 described later, by the beam splitter 131.

The condenser lens 132 is provided on the traveling direction side of the reflection light beams split by the beam splitter 131. The condenser lens 132 collects the reflection light beams split by the beam splitter 131 and guides them to the twin lenses 133 disposed on the rear side of the condenser lens 132 (the traveling direction side of the reflection light beams).

The twin lenses 133 divide the light beams guided from the condenser lens 132 into two light beams. The divided light beams form a set of subject images on an image forming surface of the imaging element 134 which is disposed on the rear side (the traveling direction side of the reflection light beams) of the twin lenses 133.

The light beams which are transmitted through the twin lenses 133 respectively form images on the imaging element 134. As a result, a set of subject images are formed on the imaging surface of the imaging element 134. Since the light beams in various directions emitted from the condenser lens 132 are incident to the twin lenses 133, a phase contrast occurs between a set of the formed subject images. Hereinafter, a set of the subject images are referred to as phase contrast images.

Next, an example of an enlarged image captured by the enlarged image capturing unit 120 and phase contrast images captured by the defocus amount detection unit 130 will be described briefly with reference to FIG. 3. FIG. 3 is a diagram illustrating an example of an enlarged image and phase contrast images of a sample.

In the microscope 10 according to the embodiment, the beam splitter 131 is disposed on the rear side of the objective lens 123, and the light beams transmitted through the objective lens 123 form images on the imaging element 124 provided in the enlarged image capturing unit 120 and the imaging element 134 provided in the defocus amount detection unit 130. Here, the phase contrast images formed on the imaging element 134 are, as shown in FIG. 3, for example, a set of images corresponding to an image viewed by the left eye and an image viewed by the right eye, and a phase contrast between the images occurs. For this reason, if the phase contrast is decreased, the two images of the phase contrast images are shifted to be far away from each other, and if the phase contrast is increased, the two images of the phase contrast images are shifted to be close to each other.

Here, in the following description, one of a set of the images forming the phase contrast images is referred to as a reference image, and the other image is referred to as a comparative image. The reference image is an image which is used as a reference when a phase contrast in phase contrast images is specified, and the comparative image is an image which is compared with the reference image when the phase contrast in the phase contrast images is specified.

Such a phase contrast is specified for each of pixels forming the phase contrast images, thereby generating phase contrast information indicating distributions of phase contrasts in the overall phase contrast images, as shown in FIG. 4. Here, since the phase contrast between the two images is a physical characteristic value which can be converted into concave and convex of a sample, information regarding the concave and convex of the sample can be obtained by obtaining the phase contrast information.

As above, the defocus amount detection unit 130 according to the embodiment has been described. In addition, in the above description, although the case where the beam splitter 131 is provided between the objective lens 123 and the imaging element 124 has been described, a beam splitting unit for splitting light beams is not limited to the beam splitter but may use a movable mirror or the like.

In addition, in the above description, although the configuration in which the condenser lens, the twin lenses, and the imaging element are provided as the phase contrast AF (Automatic Focusing) optical system inside the defocus amount detection unit 130 has been described, the present application is not limited to the example. The phase contrast AF optical system may use, for example, a field lens and a separator lens instead of the condenser lens and the twin lenses, or other optical systems as long as they can realize the equivalent function.

As above, the entire configuration of the microscope 10 according to the embodiment has been described in detail with reference to FIG. 2.

In addition, the imaging element provided in each of the thumbnail image capturing unit 110, the inorganic layer 120, and the defocus amount detection unit 130 may be a one-dimensional imaging element or a two-dimensional imaging element.

Further, in the above-described example, although the case where the defocus amount detection unit 130 is provided in the traveling direction of the light beams reflected by the beam splitter 131 has been described, the defocus amount detection unit 130 may be provided in a traveling direction of light beams transmitted through the beam splitter 131.

Entire Configuration of Microscope Control Device

The microscope 10 according to the embodiment is connected to the microscope control device 20 for controlling various parts of the microscope as shown in FIG. 2. The microscope control device 20 mainly includes, as shown in FIG. 2, an overall control unit 201, an illumination control unit 203, a stage driving control unit 205, a condenser lens driving control unit 207, a phase contrast image capturing control unit 209, a thumbnail image capturing control unit 211, an enlarged image capturing control unit 213, and a storage unit 215.

Here, the illumination control unit 203 is a processing unit which controls various kinds of light sources including the light source 111 and the light source 121 provided in the microscope 10, and the stage driving control unit 205 is a processing unit which controls the stage driving mechanism 141. The condenser lens driving control unit 207 is a processing unit which controls the condenser lens driving mechanism 142, and the phase contrast image capturing control unit 209 is a process unit which controls the imaging element 134 for capturing phase contrast images. In addition, the thumbnail image capturing control unit 211 is a processing unit which controls the imaging element 113 for capturing a thumbnail image, and the enlarged image capturing control unit 213 is a processing unit which controls the imaging element 124 for capturing an enlarged image of the biological sample SPL.

These control units are connected to the parts which are controlled via various kinds of data communication paths.

In the microscope control device 20 according to the embodiment, the control unit (the overall control unit 201) which controls the overall microscope is provided separately, and is connected to the above-described control units via various kinds of data communication paths.

The control units are implemented by a CPU (Central Processing Unit), a ROM (Read Only Memory), a RAM (Random Access Memory), a storage device, a communication device, an operational circuit, and the like.

The storage unit 215 is an example of a storage device provided in the microscope control device 20 according to the embodiment. The storage unit 215 stores various kinds of setting information for controlling the microscope 10 according to the embodiment, various kinds of databases, a lookup table, or the like. Further, the storage unit 215 may store various kinds of history information such as imaging history of samples in the microscope 10. In addition, the storage unit 215 appropriately records various parameters which are necessary to be preserved when the microscope control device 20 according to the embodiment performs a certain process, or a mid-flow progress of the process, or various kinds of databases or programs.

Each processing unit provided in the microscope control device 20 can freely read from and write in the storage unit 215.

Hereinafter, functions of the above-described control units will be described briefly.

Illumination Control Unit

The illumination control unit 203 is a processing unit which controls various light sources provided in the microscope 10 according to the embodiment. When information indicating an illumination method of the biological sample SPL is output from the overall control unit 201, the illumination control unit 203 controls illumination of a corresponding light source based on the obtained information indicating the illumination method.

For example, attention is paid to a case where the light source 111 included in the thumbnail image capturing unit 110 is controlled by the illumination control unit 203. In this case, the illumination control unit 203 determines whether to perform either a mode for obtaining a bright field image (hereinafter, referred to as a "bright field mode") or a mode for obtaining a dark field image (hereinafter, referred to as a "dark field mode") by referring to the information indicating the illumination method. Thereafter, the illumination control unit 203 sets parameters according to each mode in the light source 111, and enables the light source 111 to apply illumination light suitable for each mode. Thereby, the illumination light provided from the light source 111 is applied to the overall biological sample SPL via an aperture of the stage 140. In addition, as the parameters set by the illumination control unit 203, for example, the intensity of the illumination light, the kind of light source, or the like may be selected.

In addition, attention is paid to a case where the light source 121 included in the enlarged image capturing unit 120 is controlled by the illumination control unit 203. In this case, the illumination control unit 203 determines whether to perform either the bright field mode or the dark field mode by referring to the information indicating the illumination method. Thereafter, the illumination control unit 203 sets parameters according to each mode in the light source 121, and enables the light source 121 to apply illumination light suitable for each mode. Thereby, the illumination light provided from the light source 121 is applied to the overall biological sample SPL via the aperture of the stage 140. In addition, as the parameters set by the illumination control unit 203, for example, the intensity of the illumination light, the kind of light source, or the like may be selected.

The illumination light in the bright field mode is preferably visible light. In addition, the illumination light in the dark field mode is preferably light including a wavelength which can excite a fluorescent marker used for the special staining. In the dark field mode, a background part of the fluorescent marker is cut out.

Stage Driving Control Unit

The stage driving control unit 205 is a processing unit which controls the stage driving mechanism 141 for driving the stage provided in the microscope 10 according to the embodiment. When information indicating an imaging method of the biological sample SPL is output from the overall control unit 201, the stage driving control unit 205 controls the stage driving mechanism 141 based on the obtained information indicating the imaging method.

For example, attention is paid to a case where the microscope 10 according to the embodiment captures a thumbnail image. When information indicating that a thumbnail image of the biological sample SPL is captured is output from the overall control unit 201, the stage driving control unit 205 moves the stage 140 in the stage surface direction (X-Y axis direction) such that the overall preparation PRT is included in the imaging range of the imaging element 113. Further, the stage driving control unit 205 moves the stage 140 in the Z axis direction such that the objective lens 112 focuses on the overall preparation PRT.

In addition, attention is paid to a case where the microscope 10 according to the embodiment captures an enlarged image. When information indicating that an enlarged image of the biological sample SPL is captured is output from the overall control unit 201, the stage driving control unit 205 controls driving of the stage driving mechanism 141 and moves the stage 140 in the stage surface direction such that the biological sample SPL is located from between the light source 111 and the objective lens 112 to between the condenser lens 122 and the objective lens 123.

The stage driving control unit 205 moves the stage 140 in the stage surface direction (the X-Y axis direction) such that a predetermined site of the biological sample is located in the imaging range of the imaging element 124.

In addition, the stage driving control unit 205 controls driving of the stage driving mechanism 141, and moves the stage 140 in the direction perpendicular to the stage surface (Z axis direction, a depth direction of the tissue slice) such that the objective lens 123 focuses on the site of the biological sample SPL located in the predetermined imaging range.

Condenser Lens Driving Control Unit

The condenser lens driving control unit 207 is a processing unit which controls the condenser lens driving mechanism 142 for driving the condenser lens 122 provided in the enlarged image capturing unit 120 of the microscope 10 according to the embodiment. When information regarding a defocus amount of the illumination field stop is output from the overall control unit 201, the condenser lens driving control unit 207 controls the condenser lens driving mechanism 142 based on the obtained information regarding the defocus amount.

If the illumination field stop provided in the enlarged image capturing unit 120 does not appropriately focus, the contrast of an enlarged image which is generated is reduced. In order to prevent the reduction in the contrast, the overall control unit 201 may specify a defocus amount of the illumination field stop based on phase contrast images generated by the defocus amount detection unit 130. The overall control unit 201 outputs information indicating the specified defocus amount of the illumination field stop to the condenser lens driving control unit 207, and changes positions of the condenser lens 122 such that the illumination field stop focuses.

The condenser lens driving control unit 207 controls driving of the condenser lens driving mechanism 142 and corrects a position of the condenser lens 122 (a position on the optical axis ERA) such that the illumination field stop focuses.

Phase contrast Image Capturing Control Unit

The phase contrast image capturing control unit 209 is a processing unit which controls the imaging element 134 provided in the defocus amount detection unit 130. The phase contrast image capturing control unit 209 sets parameters according to the bright field mode or the dark field mode in the imaging element 134. In addition, when obtaining an output signal which is output from the imaging element 134 and corresponds to an image formed on the image forming surface of the imaging element 134, the phase contrast image capturing control unit 209 recognizes the obtained output signal as an output signal corresponding to phase contrast images. When obtaining the output signal corresponding to phase contrast images, the phase contrast image capturing control unit 209 outputs data corresponding to the obtained signal to the overall control unit 201. In addition, examples of the parameters set by the phase contrast image capturing control unit 209 include the starting timing and finishing timing of exposure (that is, an exposure time), and the like.

Thumbnail Image Capturing Control Unit

The thumbnail image capturing control unit 211 is a processing unit which controls the imaging element 113 provided in the thumbnail image capturing unit 110. The thumbnail image capturing control unit 211 sets parameters according to the bright field mode or the dark field mode in the imaging element 113. In addition, when obtaining an output signal which is output from the imaging element 113 and corresponds to an image formed on the image forming surface of the imaging element 113, the thumbnail image capturing control unit 211 recognizes the obtained output signal as an output signal corresponding to a thumbnail image. When obtaining the output signal corresponding to the thumbnail image, the thumbnail image capturing control unit 211 outputs data corresponding to the obtained signal to the overall control unit 201. Examples of the parameters set by the thumbnail image capturing control unit 211 include the starting timing and finishing timing of exposure, and the like.

Enlarged Image Capturing Control Unit

The enlarged image capturing control unit 213 is a processing unit which controls the imaging element 124 provided in the enlarged image capturing unit 120. The enlarged image capturing control unit 213 sets parameters according to the bright field mode or the dark field mode in the imaging element 124. In addition, when obtaining an output signal which is output from the imaging element 124 and corresponds to an image formed on the image forming surface of the imaging element 124, the enlarged image capturing control unit 213 recognizes the obtained output signal as an output signal corresponding to an enlarged image. When obtaining the output signal corresponding to the enlarged image, the enlarged image capturing control unit 213 outputs data corresponding to the obtained signal to the overall control unit 201. Examples of the parameters set by the enlarged image capturing control unit 213 include the starting timing and finishing timing of exposure, and the like.

Overall Control Unit

The overall control unit 201 is a processing unit which controls the overall microscope including the above-described control units. The overall control unit 201 obtains data regarding phase contrast images captured by the microscope 10, and can calculate a defocus amount of the illumination field stop or a thickness variation amount of the slide glass, based on the phase contrast image data. By the use of the defocus amount or the thickness variation amount of the slide glass, the overall control unit 201 can adjust a pint of the optical system included in the enlarged image capturing unit 120 of the microscope 10 and further improve pint accuracy of an obtained enlarged image.

In addition, the overall control unit 201 corrects distortion included in the phase contrast images using methods described below in detail.

Figure 5A:
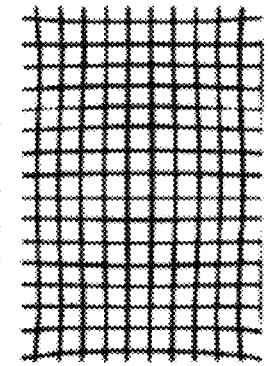
FIGS. 5A to 5D are diagrams illustrating distortions.
Figure 5B:
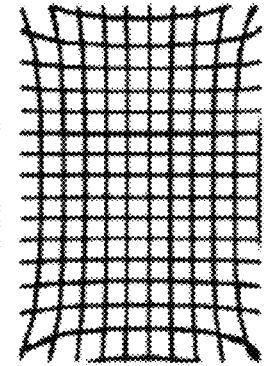
Figure 5C:
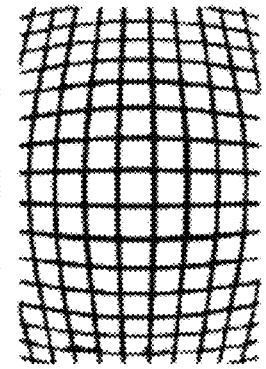
Figure 5D:
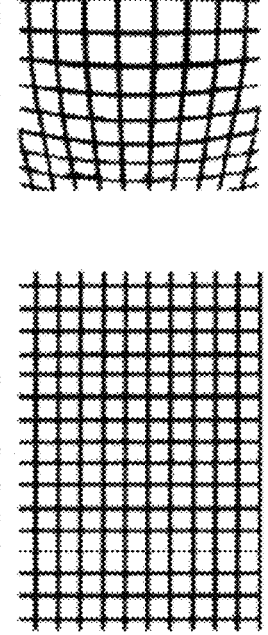

FIGS. 5A to 5D are diagrams illustrating the distortion. As described above, when a sample is imaged using the lenses, a distortion occurs in an image. When the lattice pattern having no distortion as shown in FIG. 5A is imaged using the lenses, the distortions as shown in FIGS. 5B to 5D occur and thus the actual lattice pattern is observed with the distortions. FIG. 5B shows a barrel type distortion in which the lattice pattern is observed by being distorted to a barrel type, and FIG. 5C shows a reel type distortion in which the lattice pattern is observed by being distorted like a reel. In addition, as shown in FIG. 5D, there are cases where a complicated distortion including the barrel type distortion and the reel type distortion is observed.

Since the defocus amount detection unit 130 of the microscope 10 according to the embodiment is also an imaging device which uses the phase contrast optical system, the above-described distortions are included in phase contrast images captured by the defocus amount detection unit 130 as well. The distortions in the phase contrast optical system occur due to a gap between a phase contrast (defocus amount) calculated based on the phase contrast images and a phase contrast plane unique to each pixel position. Therefore, it is possible to obtain more accurate findings regarding the phase contrast (further the defocus amount) by removing an error component caused by the distortions.

The distortion correction process in the overall control unit 201 will be described below again in detail.

The overall control unit 201 obtains microscope image data regarding the thumbnail image and the enlarged image captured by the microscope 10 from the microscope 10, and develops the data or performs predetermined digital processing for the data. Thereafter, the overall control unit 201 uploads the microscope image data regarding the thumbnail image and the enlarged image to the image management server 30 via the network 3. Thereby, a microscope image of the sample captured by the microscope 10 can be inspected from the image display device 40 which is a client device connected to the network 3.

As above, the entire configuration of the microscope control device 20 according to the embodiment has been described with reference to FIG. 2.

Configuration of Overall Control Unit

Figure 6:
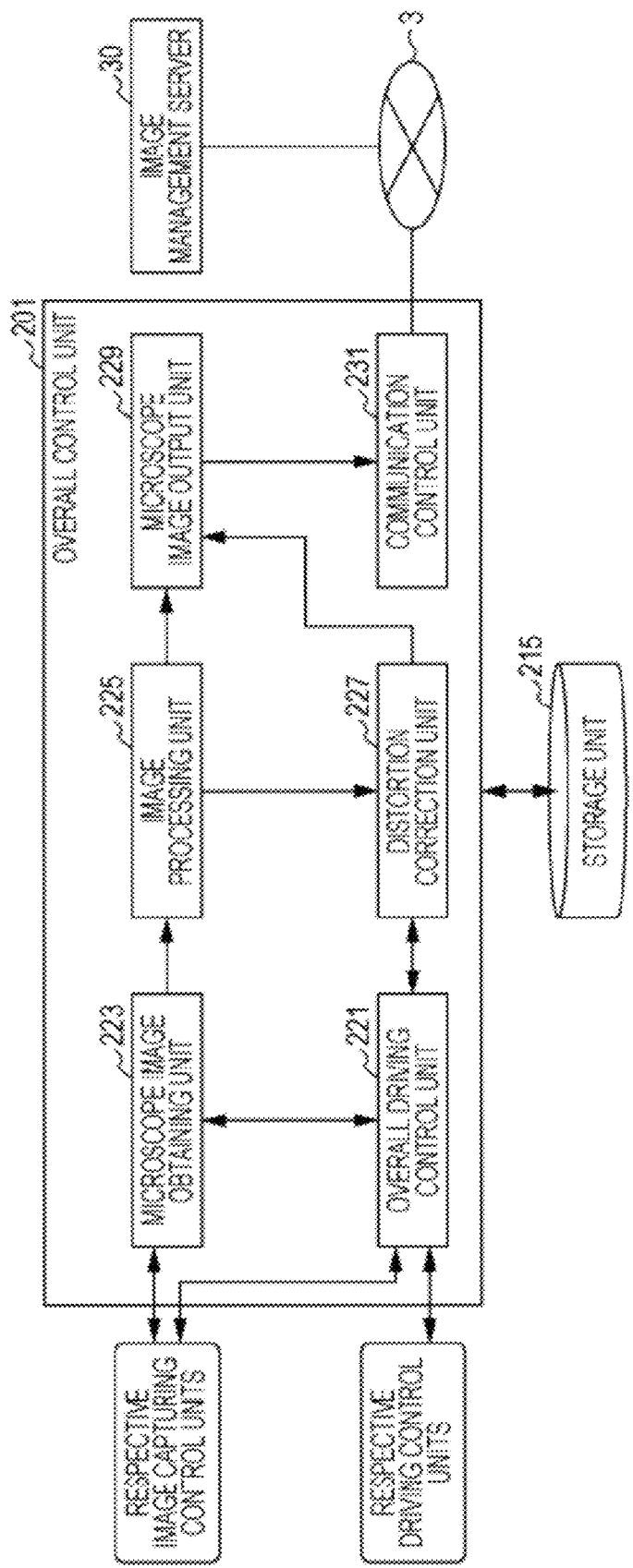
FIG. 6 is a block diagram illustrating a configuration of an overall control unit included in the microscope control device according to the same embodiment.
Figure 7:
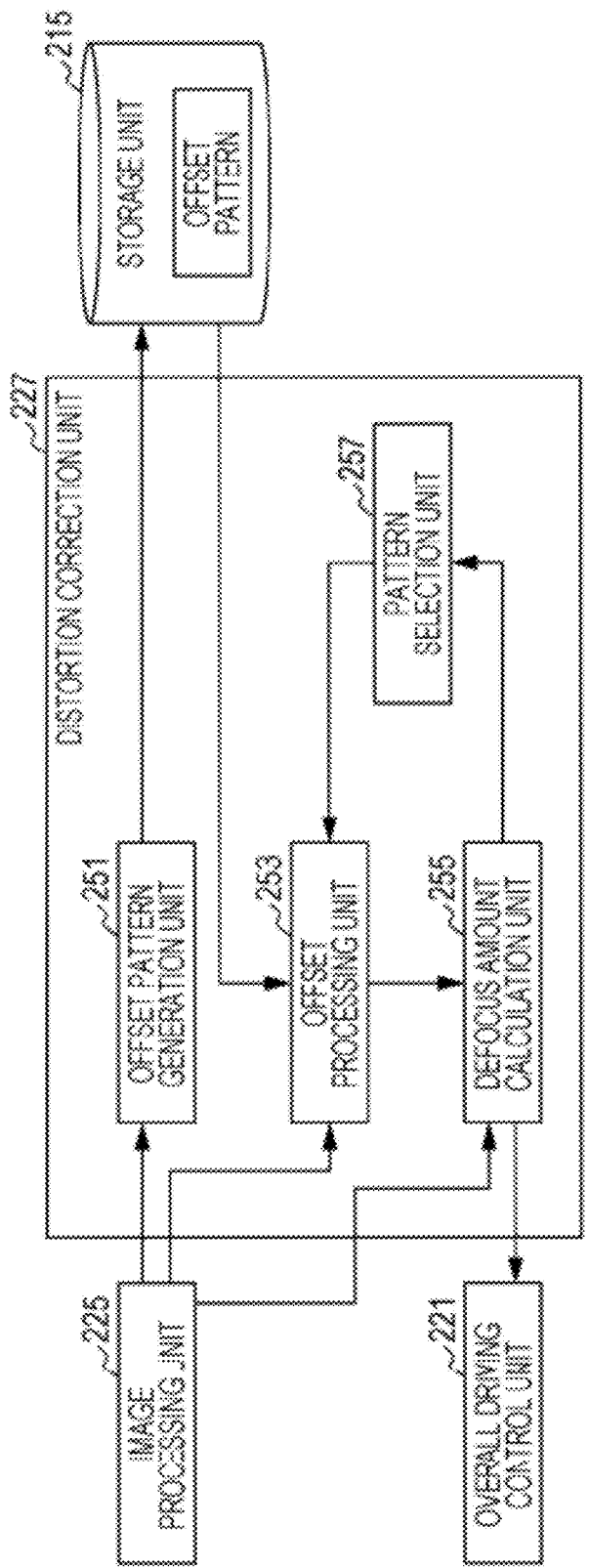
FIG. 7 is a block diagram illustrating a configuration of a distortion correction unit included in the overall control unit according to the same embodiment.

A configuration of the overall control unit 201 provided in the microscope control device 20 according to the embodiment will be described in detail with reference to FIGS. 6 and 7. FIG. 6 is a block diagram illustrating a configuration of the overall control unit according to the embodiment, and FIG. 7 is a block diagram illustrating a configuration of the distortion correction unit included in the overall control unit.

The overall control unit 201 according to the embodiment mainly includes, for example, as shown in FIG. 6, an overall driving control unit 221, a microscope image obtaining unit 223, an image processing unit 225, a distortion correction unit 227, a microscope image output unit 229, and a communication control unit 231.

The overall driving control unit 221 is implemented by, for example, a CPU, a ROM, a RAM, and the like. The overall driving control unit 221 is a driving control unit which collectively controls the control units (the illumination control unit 203, the stage driving control unit 205, the condenser lens driving control unit 207, the phase contrast image capturing control unit 209, the thumbnail image capturing control unit 211, and the enlarged image capturing control unit 213) controlling the respective parts of the microscope 10. The overall driving control unit 221 sets various kinds of information (for example, various kinds of setting parameters) in the respective parts of the microscope 10 or obtains various kinds of information from the respective parts of the microscope 10. The overall driving control unit 221 can output the various kinds of information obtained from the respective parts of the microscope 10 to the distortion correction unit 227 and the like described later.

The microscope image obtaining unit 223 is implemented by, for example, a CPU, a ROM, a RAM, a communication device, and the like. The microscope image obtaining unit 223 obtains data corresponding to an thumbnail image captured by the thumbnail image capturing unit 110, data corresponding to an enlarged image captured by the enlarged image capturing unit 120, and data corresponding to phase contrast images captured by the defocus amount detection unit 130, via the respective imaging control units.

When obtaining image data via the respective imaging control units, the microscope image obtaining unit 223 outputs the obtained image data to the image processing unit 225 described later.

In addition, the microscope image obtaining unit 223 may store the obtained image data (microscope image data) in the storage unit 215 or the like after correlation with information regarding the obtained data and the like.

The image processing unit 225 is implemented by, for example, a CPU, a GPU, a ROM, a RAM, and the like. The image processing unit 225 performs a predetermined image process for the microscope image output from the microscope image obtaining unit 223.

Specifically, when obtaining the phase contrast image data, the thumbnail image data and the enlarged image data (more specifically, raw data for the images) output from the microscope image obtaining unit 223, the image processing unit 225 performs a development process for the raw data. In addition, the image processing unit 225 connects a plurality of images forming the images to each other (a stitching process) along with the development process of the image data.

The image processing unit 225 may perform a conversion process of obtained digital image data (transcode) as necessary. The conversion process of digital images may include a process for generating JPEG images or the like through compression of digital images, a process for converting data compressed to JPEG images or the like into compressed images having different formats (for example, a GIF format). In addition, the conversion process of digital images includes a process where a second compression is performed after compressed image data is once decompressed and then undergoes a process such as an edge emphasis, a process for changing compression ratios of compressed images, and the like.

In a case where the image processing unit 225 has performed the above-described image process for the phase contrast image data, the phase contrast image data after the image process is output to the distortion correction unit 227. In addition, in a case where the image processing unit 225 has performed the above-described image process for the thumbnail image data and the enlarged image data, a microscope image formed by the images and metadata corresponding microscope image are output to the microscope image output unit 229 described later.

The distortion correction unit 227 is implemented by, for example, a CPU, a GPU, a ROM, a RAM, and the like. The distortion correction unit 227 does not directly perform the correction process regarding a distortion (distortion aberration) which is one of optical distortions, for a target image, but performs the correction process by performing an offset process for a phase contrast plane obtained by imaging a sample on the plane with respect to a phase contrast plane detected when an arbitrary sample is imaged. The distortion correction unit 227 performs the distortion correction process, and can thereby reduce influence where a calculated defocus amount is distorted due to the distortions of the optical system used to capture an image.

Detailed configuration and function of the distortion correction unit 227 according to the embodiment will be described below again.

The microscope image output unit 229 is implemented by, for example, a CPU, a ROM, a RAM, and the like. The microscope image output unit 229 outputs the microscope image and the various kinds of information such as the metadata accompanied by the corresponding microscope image which are output from the image processing unit 225, to the image management server 30 via the communication control unit 231 described later. Thereby, the microscope image (digital microscope image) of a sample captured by the microscope 10 is managed by the image management server 30.

The communication control unit 231 is implemented by, for example, a CPU, a ROM, a RAM, a communication device, and the like. The communication control unit 231 controls communication between the microscope control device 20 and the image management server 30 provided outside the microscope control device 20, performed via the network 3.

Configuration of Distortion Correction Unit

Next, a configuration of the distortion correction unit 227 according to the embodiment will be described in detail with reference to FIG. 7. FIG. 7 is a block diagram illustrating a configuration of the distortion correction unit 227 according to the embodiment.

Information directly obtained based on phase contrast images output from the defocus amount detection unit 130 which uses the phase contrast optical system obtaining a defocus amount and a defocus position of a sample in the microscope 10 is information regarding a phase contrast between the phase contrast images. However, information necessary to implement an automatic focusing mechanism in the microscope 10 is not the phase contrast information but information regarding a defocus amount calculated using the phase contrast information. For this reason, if an error component caused by the distortions is removed based on the information regarding the defocus amount which is final output information, the distortion correction may not be performed for the phase contrast images.

The distortion in the phase contrast optical system is, as described above, a gap between a detected phase contrast (defocus amount) and a phase contrast plane unique to each pixel position. Therefore, phase contrast images of the plane lying in a state of focusing on the enlarged image capturing unit 120 are captured in advance using a slide for calibration where a texture using which a phase contrast is easily detected by the defocus amount detection unit 130 of the microscope 10 is disposed on the plane having high accuracy. A phase contrast plane of the plane in a focus state is calculated using the phase contrast images. The phase contrast plane obtained in this way is an offset plane of phase contrasts unique to the distortions of the optical system caused by manufacturing errors or design specifications of the microscope 10. Therefore, it is possible to easily remove influence on a defocus amount caused by the distortions in the phase contrast optical system by calculating a difference with the offset plane with respect to each pixel of a phase contrast plane generated from phase contrast images obtained by imaging an arbitrary sample. In addition, a calculation amount in this process is defined by a calculation amount of image size x subtraction process, and thus it is possible to considerably decrease calculation loads such as the calculation amount or resources as compared with the distortion correction in the related art for performing a vector calculation of the distortion correction for each pixel.

The distortion correction unit 227 according to the embodiment, which performs the process, mainly includes, as shown in FIG. 7, an offset pattern generation unit 251, an offset processing unit 253, a defocus amount calculation unit 255, and a pattern selection unit 257.

The offset pattern generation unit 251 is implemented by, for example, a CPU, a GPU, a ROM, a RAM, and the like. The offset pattern generation unit 251 obtains phase contrast images generated by imaging a sample for calibration and analyzes the phase contrast images for calibration, thereby calculating a phase contrast between the obtained phase contrast images for calibration.

Figure 8:
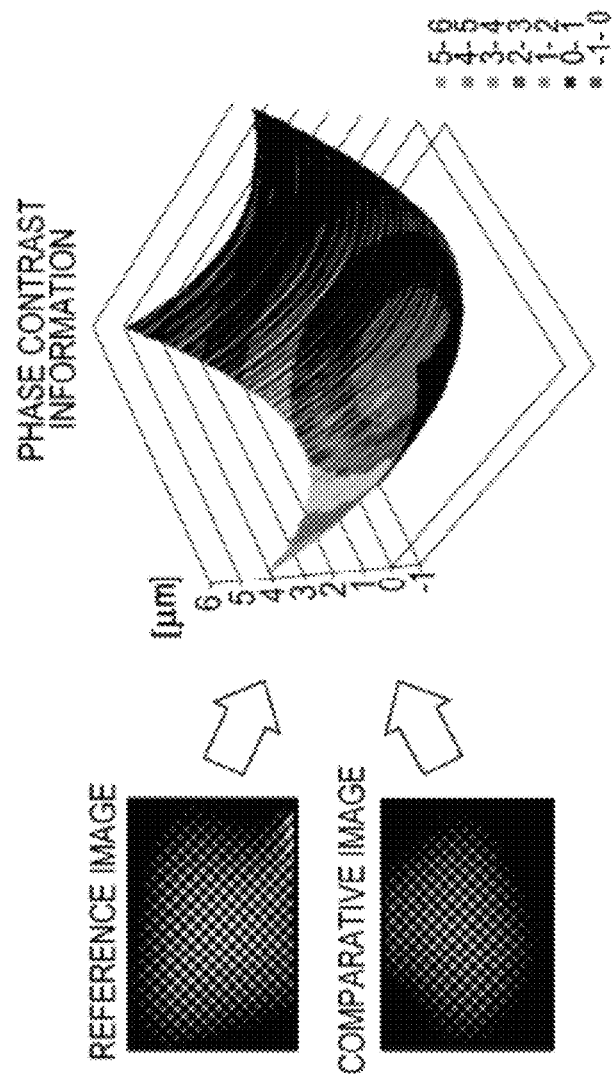
FIG. 8 is a diagram illustrating an offset pattern according to the same embodiment.

The sample for calibration is to dispose a texture (for example, a shape with the lattice pattern as shown in FIG. 8) using which a phase contrast is easily detected on the plane having high accuracy. The phase contrast images for calibration are generated by the defocus amount detection unit 130 imaging the plane in a state of focusing on the enlarged image capturing unit 120 of the microscope 10.

A plane indicating the phase contrast between the phase contrast images for calibration obtained in this way is curved as shown in FIG. 8 although the sample originally present on the plane is imaged. The phase contrast plane calculated from the phase contrast images obtained by imaging the lattice pattern which is disposed on the plane indicates phase contrasts unique to the distortions of the optical system caused by manufacturing errors or design specifications of the microscope 10 as described above. In addition, the phase contrast plane may be information where positions of pixels on the phase contrast images are correlated with phase contrasts for corresponding pixels. The phase contrast plane obtained by imaging the sample for calibration in the focus state may be employed as an offset pattern used as a reference (reference offset pattern) when the distortion correction process is performed.

In addition, distorted shapes of the phase contrast images are varied depending on a positional relationship between the stage 140 and the objective lens 123 of the microscope 10. Since the enlarged image capturing unit 120 records an image of a target to be captured in a focus state and is set to a very low depth of field, the correction may be performed only for unique distorted shapes. In contrast, the phase contrast optical system (the defocus amount detection unit 130) used as a focus adjustment device (automatic focusing mechanism) is designed to have a high depth of field and measure an defocus amount in a wide operation range with respect to a focal position. For this reason, an offset amount caused by distortions is varied depending on a defocus state. Therefore, the offset pattern generation unit 251 according to the embodiment separately prepares for the above-described offset plane of phase contrasts unique to distortions for each of a plurality of defocus states.

Therefore, the offset pattern generation unit 251 according to the embodiment generates the offset pattern in the focus state (reference offset pattern) and a plurality of offset patterns for respective defocus states.

In addition, the distortions depend on combinations of optical elements such as lenses used to capture the phase contrast images. For this reason, the offset pattern generation unit 251 generates a reference offset pattern and a plurality of offset patterns for respective defocus states, for example, for each of combinations of objective lenses used in the microscope 10.

The offset pattern generation unit 251 stores the plurality of offset patterns generated in this way in the storage unit 215 or the like.

In addition, the generation process of the offset patterns by the offset pattern generation unit 251 may be performed at an arbitrary timing such as before shipment of the microscope 10, when maintenance for the microscope 10 is performed, or when the starting of generation of offset patterns is requested by a user.

The offset processing unit 253 is implemented by, for example, a CPU, a GPU, a ROM, a RAM, and the like. When phase contrast images of a certain sample is output from the image processing unit 225, first, the offset processing unit 253 calculates a phase contrast between the phase contrast images based on a set of the obtained phase contrast images.

A method for calculating the phase contrast based on the phase contrast images is not particularly limited but may use existing methods, for example, a phase contrast between the phase contrast images may be calculated through the following methods.

In other words, the offset processing unit 253 uses one of the phase contrast images as a reference image and the other image as a comparative image, and partitions the reference image into local sub-regions. Thereafter, the offset processing unit 253 searches the comparative image for an image region matching with each sub-region on the reference image, and designates parallax between the two images (the reference image and the comparative image) as a phase contrast (phase contrast information) between the phase contrast images.

When calculating the phase contrast from the obtained phase contrast images, the offset processing unit 253 obtains the reference offset pattern (the offset pattern in the focus state) among the offset patterns stored in the storage unit 215 or the like. Thereafter, the offset processing unit 253 subtracts the obtained reference offset pattern from the calculated phase contrast information (specifically, a value of a phase contrast of a corresponding pixel on the reference offset pattern is subtracted from a value of a phase contrast of each pixel in the calculated phase contrast information). Thereby, an amount caused by the distortions is removed from the calculated phase contrast information.

When the offset process using the reference offset pattern is completed, the offset processing unit 253 outputs the phase contrast information after the offset process to the defocus amount calculation unit 255 described later.

In addition, after the phase contrast information after the offset process is output to the defocus amount calculation unit 255, when the pattern selection unit 257 described later designates an offset pattern used for the offset process, the offset processing unit 253 performs again the above-described offset process using the designated offset pattern.

The defocus amount calculation unit 255 is implemented by, for example, a CPU, a GPU, a ROM, a RAM, and the like.

The defocus amount calculation unit 255 calculates a defocus amount of the sample (that is, a distance of the sample from a focal position) based on the phase contrast information after the offset correction which is output from the offset processing unit 253.

For example, since the phase contrast and the defocus amount in the phase contrast images have the correlation therebetween, the defocus amount calculation unit 255 can calculate the defocus amount of the sample by the use of the correlation between a phase contrast and a defocus amount, which is determined in advance, and the calculated phase contrast.

In addition, a method in which the defocus amount calculation unit 255 calculates a defocus amount of the sample based on a phase contrast is not particularly limited but may use all the existing methods.

FIG. 9 shows how a calculated defocus amount is varied depending on whether or not to perform the offset process as described above. As in the graph shown in FIG. 9, when the defocus amount is calculated without the offset correction, a plurality of peaks is observed and thus an accurate defocus amount is difficult to specify. However, in the graph showing a result after the correction through the offset correction process as described above, a clear peak is observed around −1.5 μm and thus an accurate defocus amount can be specified.

The defocus amount calculation unit 255 outputs the defocus amount calculated in this way to the overall driving control unit 221. The overall driving control unit 221 can realize the automatic focusing function in the microscope 10 by, for example, controlling the stage driving control unit 205 using the defocus amount calculated in this way.

In addition, the defocus amount calculation unit 255 may output the calculated defocus amount to the pattern selection unit 257 described later, so as to further improve accuracy of the calculated defocus amount.

The pattern selection unit 257 is implemented by, for example, a CPU, a ROM, a RAM, and the like. The pattern selection unit 257 selects an offset pattern generated at a condition (defocus amount) closest to the corresponding defocus amount from the storage unit 215 or the like, based on the defocus amount output from the defocus amount calculation unit 255.

As described above, the phase contrast optical system used as an automatic focusing mechanism is designed to have the high depth of field and measure a defocus amount in a wide range with respect to a focal position. For this reason, an offset amount caused by the distortions is varied depending on a defocus state. Therefore, the pattern selection unit 257 determines whether or not the defocus amount output from the defocus amount calculation unit 255 fits in well with the offset pattern used by the offset processing unit 253. In addition, if a suitable offset pattern is not used, an offset plane closest to the calculated defocus amount is selected from the plurality of offset patterns registered in advance.

The distortion correction unit 227 according to the embodiment partitions the overall range of values which the calculated defocus amount can have into several sections, and prepares for at least one offset pattern for each section. In this way, the distortion correction unit 227 according to the embodiment can realize the offset correction process by which errors caused by the distortions are not easily occur in a wide defocus range.

Figure 10:
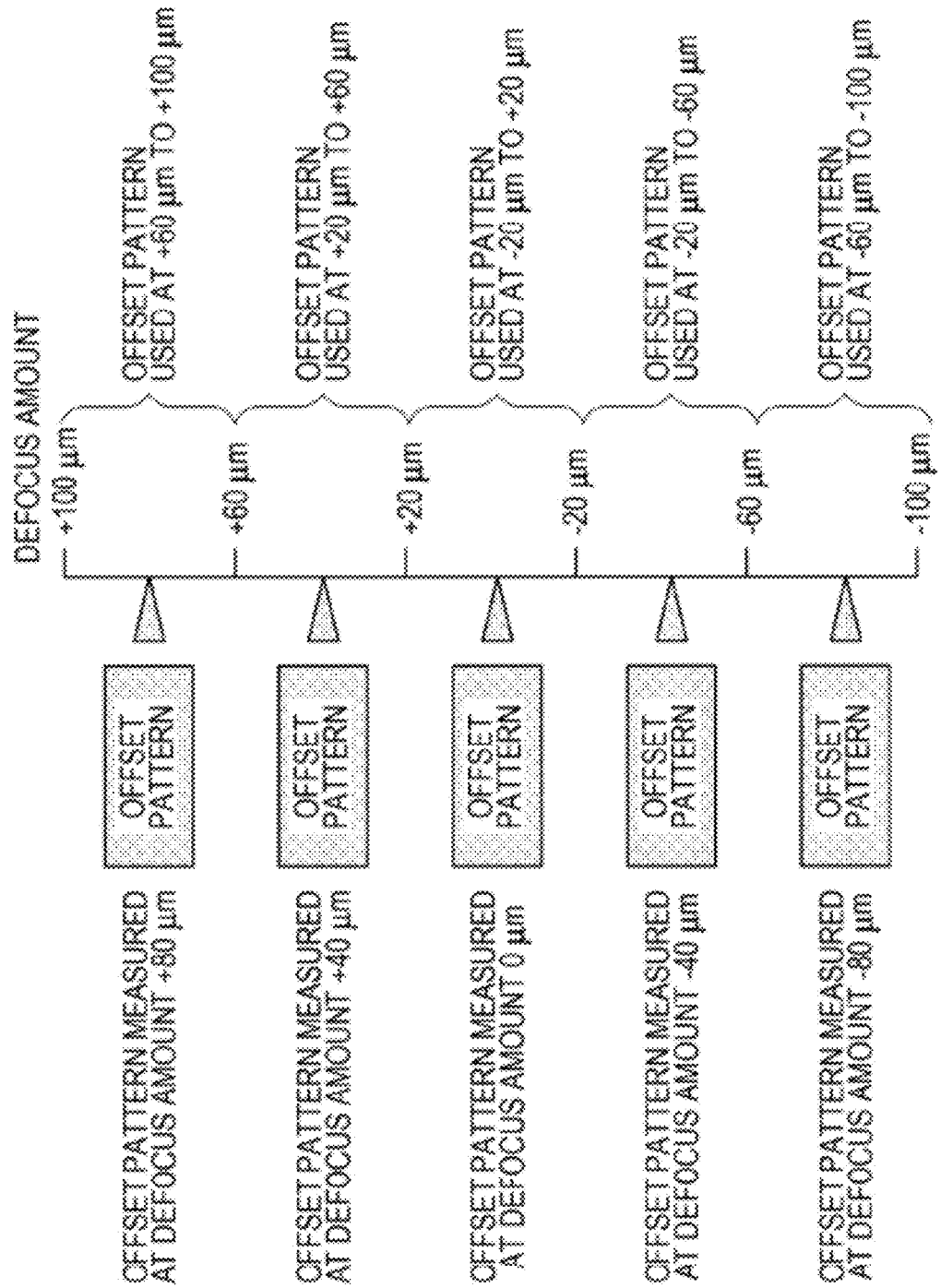
FIG. 10 is a diagram illustrating an offset correction process according to the same embodiment.

For example, in an example shown in FIG. 10, a range of value which the defocus amount can have is −100 μm to +100 μm, and this range is partitioned into five sections. Further, the offset pattern around the intermediate value in the range of each section is registered in advance. In addition, as shown in the example shown in FIG. 10, only a single offset patter is set for each section, but a plurality of offset patterns may be set for each section. In the example shown in FIG. 10, although the range of values which the defocus amount can have is partitioned into five sections, the number of partitioned sections is not limited to the example shown in the figure. It is possible to perform a more accurate offset correction process by increasing the number of partitioned sections or increasing the number of offset patterns registered for each section.

Here, when the calculated defocus amount is, for example, in a range of −20 μm to +20 μm, the pattern selection unit 257 determines whether or not an offset pattern (an offset pattern of the defocus amount 0 μm in the case of FIG. 10) suitable for the range of −20 μm to +20 μm is used. Since the offset processing unit 253 first uses the reference offset pattern (the offset pattern of the defocus amount 0 μm), in this case, the pattern selection unit 257 determines that a suitable offset pattern is selected and thus does not select a new offset pattern.

On the other hand, when the calculated defocus amount is, for example, in a range of +60 μm to +100 μm, a suitable offset pattern in this case is the offset pattern measured at the defocus amount +80 μm. However, since the offset processing unit 253 performs the offset process using the reference offset pattern, the pattern selection unit 257 selects the offset pattern measured at the defocus amount +80 μm based on FIG. 10.

The pattern selection unit 257 notifies the offset processing unit 253 of information for specifying the offset pattern selected in this way. The offset processing unit 253 receiving the notification obtains the designated offset pattern from the storage unit 215 or the like, and performs again the offset process based on the obtained offset pattern.

As above, the configuration of the distortion correction unit 227 according to the embodiment has been described in detail with reference to FIG. 7.

In addition, an example of the function of the microscope control device 20 according to the embodiment has been described. Each of the above-described constituent elements may be constituted using general members or circuits, or may be constituted by hardware specific to the function of each constituent element. All the functions of the respective constituent elements may be performed by the CPU or the like. Therefore, a configuration to be used may be appropriately modified according to the technical level at the time when the embodiment is practiced.

Further, a computer program for realizing the respective functions of the microscope control device 20 according to the embodiment as described above may be created and installed in a personal computer or the like. Further, it is possible to provide a recording medium which stores the computer program therein and is readable by a computer. The recording medium includes, for example, a magnetic disk, an optical disc, a magneto-optical disc, a flash memory, and the like. The computer program may be delivered via, for example, a network, without using the recording medium.

First Modified Example

Figure 11:
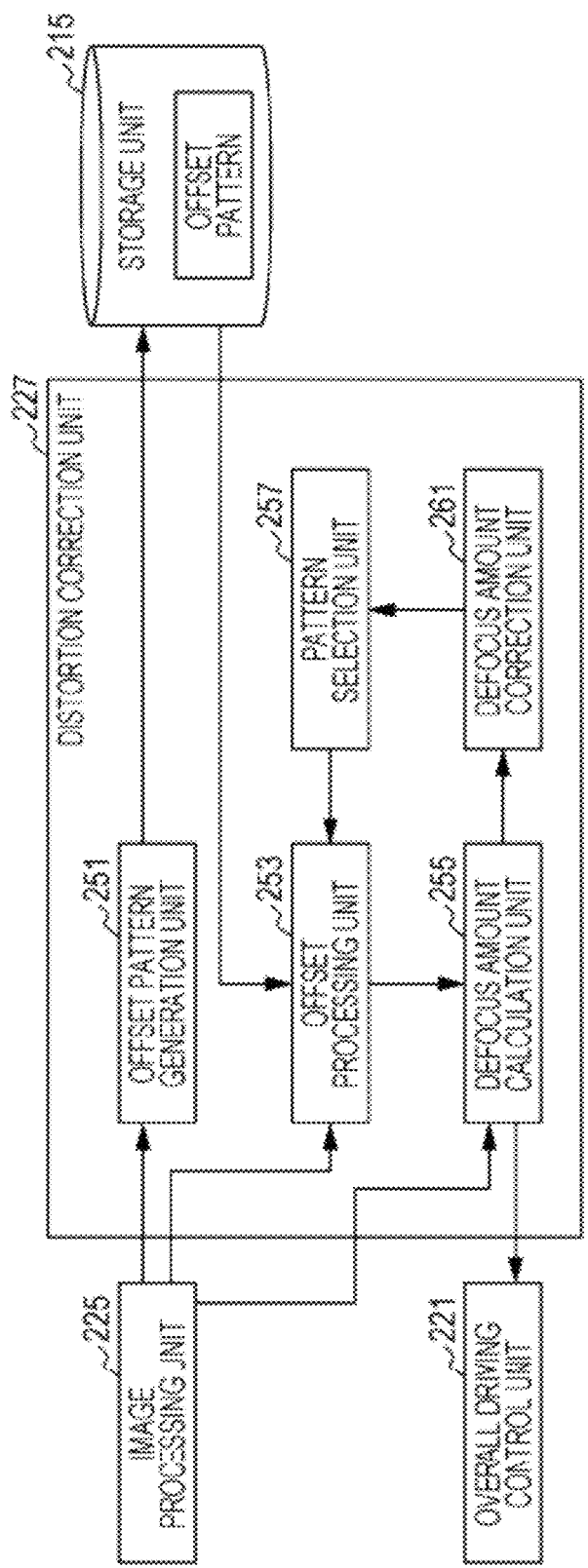
FIG. 11 is a block diagram illustrating a first modified example of the distortion correction unit according to the same embodiment.

Next, a first modified example of the distortion correction unit 227 according to the embodiment will be described briefly with reference to FIG. 11. FIG. 11 is a block diagram illustrating the first modified example of the distortion correction unit according to the embodiment.

The enlarged image capturing unit 120 (more specifically, between the light source 121 and the stage 140) of the microscope 10 according to the embodiment is provided with an illumination field stop (not shown) and can align the illumination field stop using phase contrast images. In addition, in a process when the illumination field stop is aligned, a thickness variation amount of a sample placed on the stage (more specifically, a sample and cover glass placed on the slide glass) or the thickness itself can be calculated.

On the other hand, even if the cover glass which is disposed to cover the sample is a standardized article according to a certain standard, the thickness thereof has a variation in the order of 0.01 mm. As a result, there is a case where spherical aberration causes a focal position observed from phase contrast images to be varied by 0.1 µm with respect to the thickness variation 0.01 mm of the cover glass.

Therefore, in the first modified example described below, the thickness of the cover glass is calculated by analyzing the phase contrast images, and an offset adjustment is performed for a calculated focal position (defocus amount) using the calculated thickness of the cover glass, thereby further improving calculation accuracy of the defocus amount.

The distortion correction unit 227 according to the modified example mainly includes, for example, as shown in FIG. 11, an offset pattern generation unit 251, an offset processing unit 253, a defocus amount calculation unit 255, a pattern selection unit 257, and a defocus amount correction unit 261.

Here, the offset pattern generation unit 251, the offset processing unit 253, and the defocus amount calculation unit 255 according to the modified example are the same as the respective processing units according to the first embodiment and achieve the same effect. Therefore, the detailed description thereof will be omitted in the following.

The pattern selection unit 257 according to the modified example is the same as the pattern selection unit 257 according to the first embodiment and achieves the same effect except for selecting an offset pattern based on a defocus amount output from the defocus amount correction unit 261 described later. Therefore, the detailed description thereof will be omitted in the following.

The defocus amount correction unit 261 is implemented by, for example, a CPU, a ROM, a RAM, and the like. The defocus amount correction unit 261 calculates the thickness of the cover glass covering the sample through analysis of phase contrast images. In addition, the defocus amount correction unit 261 corrects the defocus amount calculated by the defocus amount calculation unit 255 based on the calculated thickness of the cover glass.

Hereinafter, first, the calculation process of the thickness of the cover glass will be described with reference to FIGS. 12 to 14.

Figure 12:
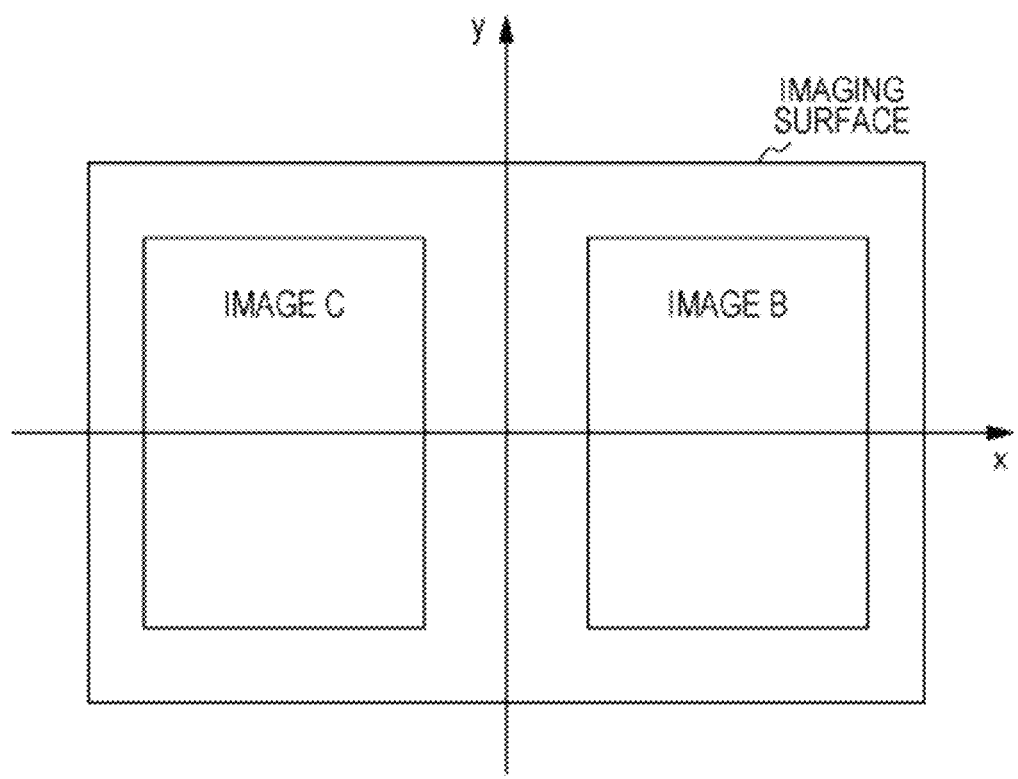
FIG. 12 is a diagram illustrating a calculation process of the thickness of cover glass.

As exemplified in FIG. 12, two subject images (the image B and the image C) as the phase contrast images are formed on the imaging element 134 in the defocus amount detection unit 130 according to the embodiment. Here, it is assumed that the illumination field stop and the condenser lens provided between the image reading region 121 and the stage 140 have a suitable positional relationship and illumination light is suitably applied on the slide glass. In this case, windows indicating visual field regions in the phase contrast images are located at the same positions as an image corresponding to the left lens of the twin lenses 133 and an image corresponding to the right lens thereof. However, if the condenser lens is not present at the suitable position and the illumination position is lower than the suitable position (the light source 121 side), the windows indicating the visual field regions are moved to be close to the center of the imaging element 134 (close to the center of the imaging element 134 in the x axis direction shown in FIG. 12). On the contrary, if the illumination position is higher than the suitable position, the windows indicating the visual field regions are moved toward the edges of the imaging element 134 in the x axis direction. Therefore, it is possible to specify an illumination position by paying attention to the positional relationship of the windows formed on the imaging element 134.

Here, a gap between the left and right window positions on the phase contrast images is measured in advance by variously changing the illumination position (for example, the distance between the illumination field stop and the condenser lens), and a correlation between the gap between the window positions and the illumination position is grasped. In this correlation, the illumination position is expressed as a difference from the suitable position, and thereby it is possible to calculate a difference from the suitable illumination position based on the gap between the window positions.

At this time, the gap between the left and right window positions in the phase contrast images can be specified as shown in FIGS. 13A to 13C. In other words, if an axis, passing through the center of the imaging element 134, corresponding to the width direction of the imaging element 134 is assumed as an x axis, attention to a distribution of output signal values (that is, luminance values) of the imaging element 134 on the x axis is paid. Since the two images, the image corresponding to the left lens and the image corresponding to the right lens are formed on the imaging element 134, a distribution of the luminance values corresponding to the image for the left lens and a distribution of the luminance values corresponding to the image for the right lens are detected, as shown in FIG. 13A.

First, the defocus amount correction unit 261 smoothens the luminance values of the images corresponding to the left and right lenses by using the moving average, and detects the maximal values (Lmax and Rmax) and the minimal values (Lmin and Rmin) of the left and right luminance, respectively. Thereafter, the defocus amount correction unit 261 normalizes the respective left and right luminance values independently from each other. As a result, the defocus amount correction unit 261 can obtain the luminance distribution as shown in FIG. 13B. The defocus amount correction unit 261 searches the normalized luminance distribution for positions of pixels having luminance values exceeding a predetermined threshold value, and, at this time, the image corresponding to the left lens is searched from the left end of the luminance distribution, and the image corresponding to the right lens is searched from the right end of the luminance distribution. Here, as shown in FIG. 13B, it is assumed that the image corresponding to the left lens has a predetermined luminance value at the coordinate Lpos, and the image corresponding to the right lens has the predetermined luminance value at the coordinate Rpos. In this case, the defocus amount correction unit 261 treats a difference between the coordinates Lpos and Rpos as a gap between the left and right window positions in the phase contrast images, as shown in FIG. 13C.

In this way, by specifying the correlation between the gap between window positions and the illumination position in advance, the defocus amount correction unit 261 can specify an illumination position based on an actually measured gap between window positions and the correlation. In addition, the defocus amount correction unit 261 measures in advance a correlation between an illumination position and an entire thickness of a sample using the sample of which the entire thickness is known, and can calculate the entire thickness T of the sample based on the specified illumination position.

Figure 14:
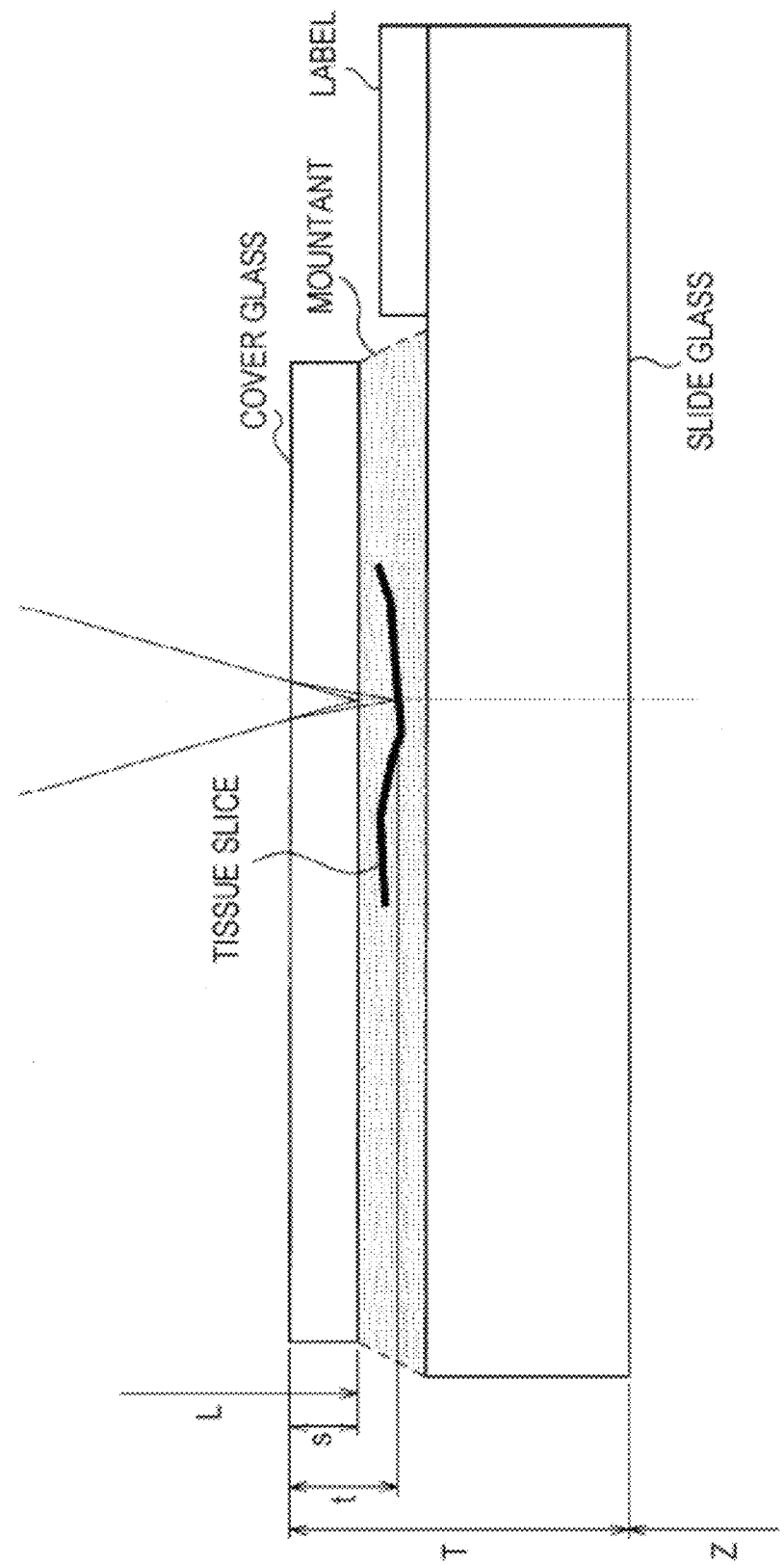
FIG. 14 is a diagram illustrating a calculation process of the thickness of a cover glass.

In addition, the respective thicknesses are denoted as shown in FIG. 14.

L: A focal distance in air
s: A portion of a focal distance in air cut out by a sample
t: The thickness of cover glass +the thickness of a mountant at an imaging position
T: The entire thickness of a sample
Z: A stage position Here, the focal point in air is a fixed value defined by the kind of objective lens or the like, the entire thickness T of a sample is a value which can be calculated through the above-described processes, and the stage position is a value which can be obtained from the overall driving control unit 221.

In addition, in FIG. 14, if the refractive index of glass is denoted by δ, the relationship of δs=t is established, and the relationship of L−s+T+Z=constant value (this value is denoted by C) is established.

Therefore, the thickness t of the cover glass and the mountant at an imaging position is expressed as in the following Equation 151.

$$t=\delta(L+T+Z-C) \quad (151)$$

Thereby, the defocus amount correction unit 261 can calculate the thickness of the cover glass (more specifically, the sum of the thickness of the cover glass and the thickness of the mountant at the imaging position) using the entire thickness T of the sample obtained by analyzing the phase contrast images, the parameters L and C which are design values, the stage position Z obtained from the overall driving control unit 221, and the refractive index δ of glass.

The defocus amount correction unit 261 according to the modified example performs the offset adjustment for the defocus amount output from the defocus amount calculation unit 255 using the calculated thickness of the cover glass. Thereby, it is possible to prevent out-of-focus from occurring due to the thick cover glass without changing the number of driving, and thus it is possible to further heighten accuracy of focus detection.

The defocus amount correction unit 261 outputs information indicating the defocus amount after the offset process, to the pattern selection unit 257. Thereby, the pattern selection unit 257 can select an offset pattern based on the defocus amount where the out-of-focus due to the thick cover glass has been corrected.

As above, an example of the function of the microscope control device 20 according to the modified example has been described. Each of the above-described constituent elements may be constituted using general members or circuits, or may be constituted by hardware specific to the function of each constituent element. All the functions of the respective constituent elements may be performed by the CPU or the like. Therefore, a configuration to be used may be appropriately modified according to the technical level at the time when the embodiment is practiced.

Optical Distortion Correction Method

Figure 15:
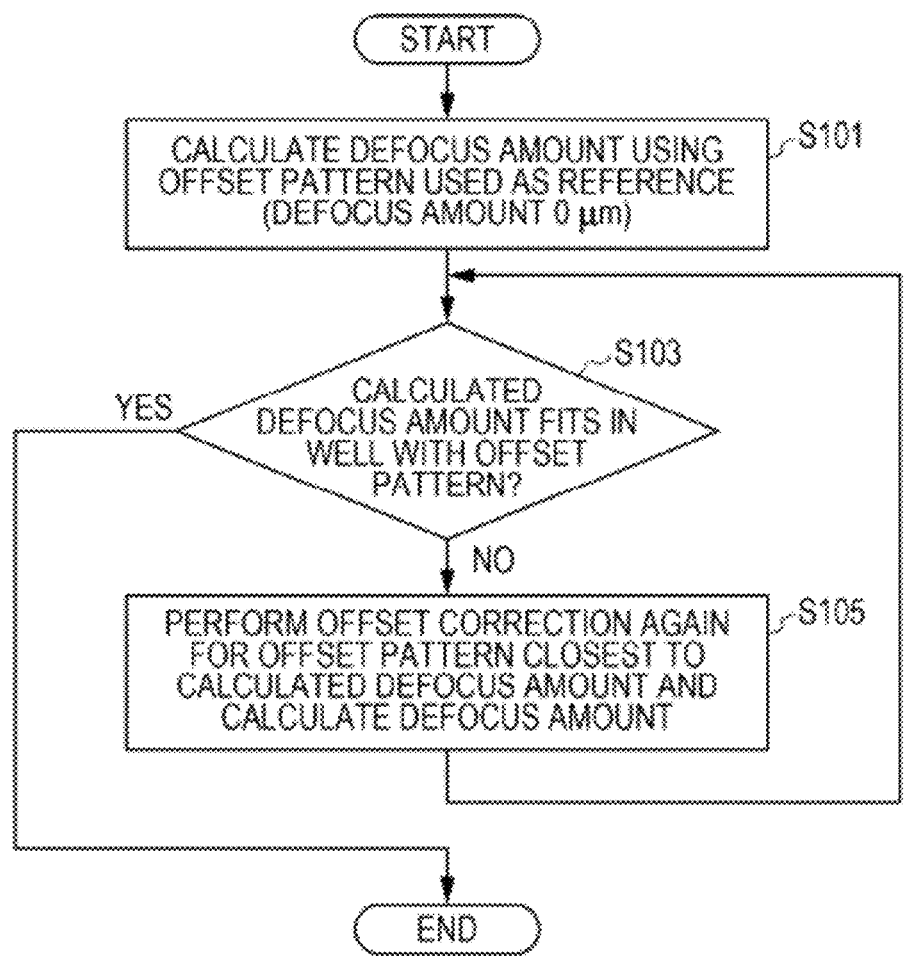
FIG. 15 is a flowchart illustrating the flow of a distortion correction method according to an embodiment.

Next, with reference to FIG. 15, the flow of the optical distortion correction method (more specifically, the distortion correction method) according to the embodiment will be described. FIG. 15 is a flowchart illustrating the flow of the optical distortion correction method according to the embodiment.

Before the following description, it is assumed that a plurality of offset patterns for respective defocus amounts, including an offset pattern at the defocus amount 0 μm (reference offset pattern) is generated by the offset pattern generation unit 251.

When phase contrast images is output from the image processing unit 225, the offset processing unit 253 of the distortion correction unit 227 analyzes the obtained phase contrast images and calculates a phase contrast between the phase contrast images. Next, the offset processing unit 253 obtains an offset pattern used as a reference (an offset pattern at the defocus amount 0 μm) from the storage unit 215 or the like, and subtracts a phase contrast described in the offset pattern used as a reference from the calculated phase contrast.

Thereafter, the offset processing unit 253 outputs the phase contrast after the offset process to the defocus amount calculation unit 255.

The defocus amount calculation unit 255 calculates a defocus amount using information regarding the phase contrast after the offset process, sent from the offset processing unit 253 (step S101). Thereafter, the defocus amount calculation unit 255 outputs the calculated defocus amount to the pattern selection unit 257.

The pattern selection unit 257 determines whether or not the calculated defocus amount fits in well with the offset pattern to be used (step S103). If a suitable offset pattern is used, the distortion correction unit 227 finishes the distortion correction process and outputs the calculated defocus amount to the overall driving control unit 221.

On the other hand, if a suitable offset pattern is not used, the pattern selection unit 257 selects an offset pattern closest to the calculated defocus amount and outputs the selected offset pattern to the offset processing unit 253.

The offset processing unit 253 and the defocus amount calculation unit 255 perform the offset process and the defocus amount calculation process again using the offset pattern sent from the pattern selection unit 257 (step S105). Thereafter, the pattern selection unit 257 performs again the process in step S103 for the defocus amount which is output again from the defocus amount calculation unit 255.

In the optical distortion correction process (distortion correction process) according to the embodiment, it is possible to exclude influence where a calculated defocus amount is distorted due to the distortions of the optical system with very little calculation load by performing the process as described above.

Hardware Configuration

Figure 16:
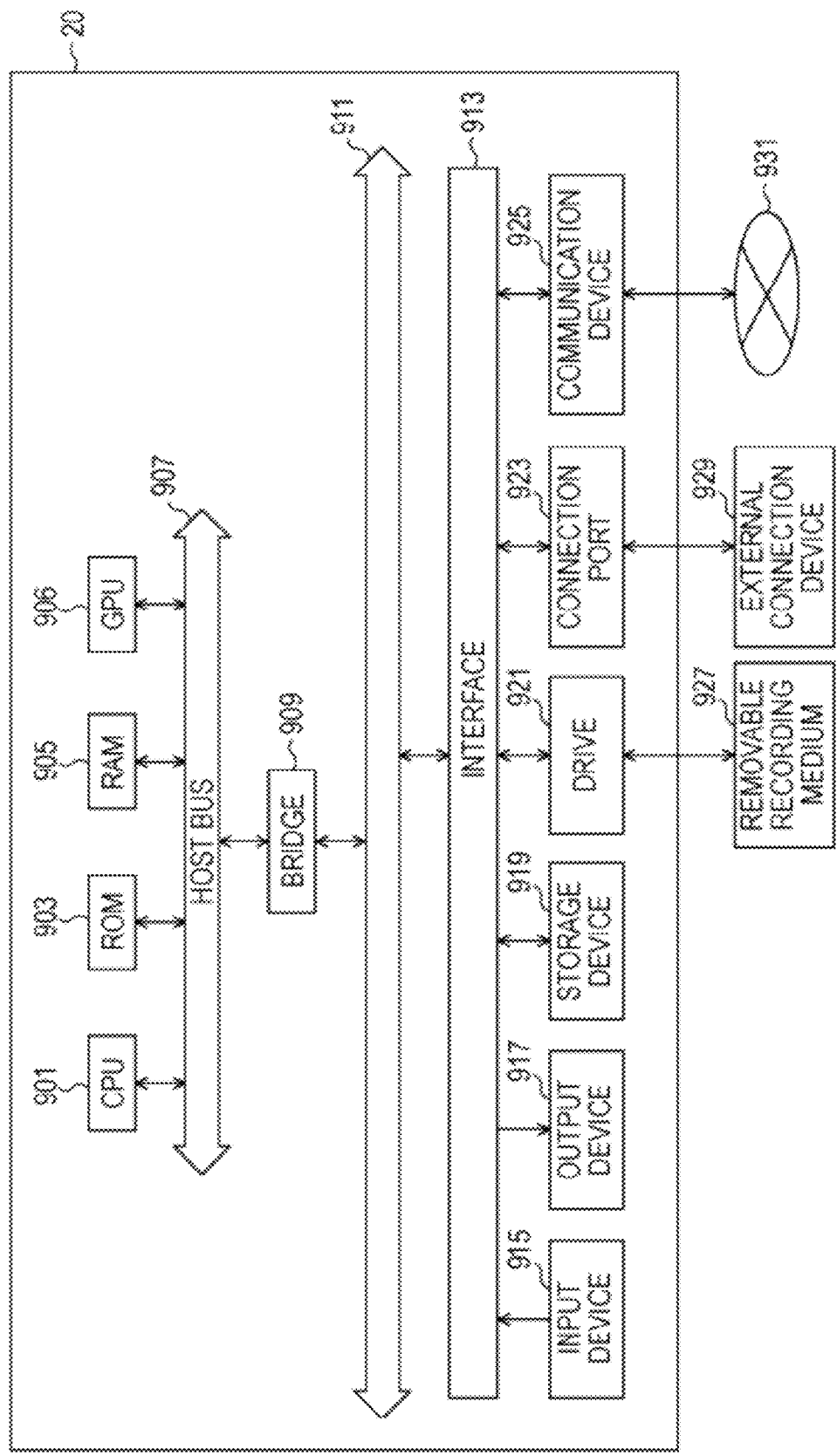
FIG. 16 is a block diagram illustrating a hardware configuration of the microscope control device according to an embodiment.

A hardware configuration of the microscope control device 20 according to the embodiment will be described in detail with reference to FIG. 16. FIG. 16 is a block diagram illustrating a hardware configuration of the microscope control device 20 according to the embodiment.

The microscope control device 20 mainly includes a CPU 901, a ROM 903, a RAM 905, a GPU (Graphics Processing Unit) 906. In addition, the microscope control device 20 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls the whole operation of the microscope control device 20 or a portion thereof according to various kinds of programs recorded in the ROM 903, the RAM 905, the storage device 919, or a removable recording medium 927. The ROM 903 stores programs or operational parameters used by the CPU 901. The RAM 905 primarily stores programs used by the CPU 901, parameters which are appropriately varied in executing the programs, or the like. In addition, the GPU 906 functions as an arithmetic processing unit and a control device, which performs an arithmetic process regarding various kinds of image processes performed in the microscope control device 20. The GPU 906 controls all operations of the image processes in the microscope control device 20 or a portion thereof according to various kinds of programs recorded in the ROM 903, the RAM 905, the storage device 919, or a removable recording medium 927. They are connected to each other via the host bus 907 formed by internal buses such as a CPU bus.

The host bus 907 is connected to the external bus 911 such as a PCI (Peripheral Component Interconnect/Interface) bus via the bridge 909.

The input device 915 is an operation device which is operated by a user, such as, for example, a mouse, a keyboard, a touch panel, a button, a switch, and a lever. In addition, the input device 915 may be, for example, a remote control device (a so-called remote controller) using infrared rays or other electric waves, or may be an external connection device 929 such as a mobile phone or a PDA supporting the operation of the microscope control device 20. Further, the input device 915 is constituted by, for example, an input control circuit or the like, which generates an input signal based on information input by a user using the operation device and outputs the input signal to the CPU 901. A user of the microscope control device 20 can input various kinds of data to the microscope control device 20 or instruct the microscope control device 20 to perform processes by operating the input device 915.

The output device 917 includes devices which can notify a user of obtained information in a visible or audible manner. These devices include display devices such as CRT display devices, liquid crystal displays, plasma display panels, EL displays, and lamps, audio output devices such as speakers and headphones, printer devices, mobiles phones, facsimiles, and the like. The output device 917 outputs, for example, results obtained by various kinds of processes performed by the microscope control device 20. Specifically, the display device displays results obtained by various kinds of processes performed by the microscope control device 20, as a text or an image. On the other hand, the audio output device converts an audio signal including reproduced audio data, sound data, or the like into an analog signal so as to be output.

The storage device 919 is a device for storing data, which is formed as an example of a storage unit of the microscope control device 20. The storage device 919 includes, for example, a magnetic storage device such as an HDD (Hard Disk Drive), a semiconductor storage device, an optical storage device, a magneto-optical storage device, and the like. The storage device 919 stores programs or various kinds of data executed by the CPU 901, various kinds of data obtained from an external device, and the like.

The drive 921 is a reader and writer for a recording medium, and is embedded in or installed outside the microscope control device 20. The drive 921 reads information recorded in the removable recording medium 927 such as a magnetic disk, an optical disc, a magneto-optical disc, or a semiconductor memory, which is installed, and outputs the read information to the RAM 905. In addition, the drive 921 writes information in the removable recording medium 927 such as a magnetic disk, an optical disc, a magneto-optical disc, or a semiconductor memory, which is installed. The removable recording medium 927 includes, for example, a DVD medium, an HD-DVD medium, a Blu-ray medium, and the like. In addition, the removable recording medium 927 may be a Compact Flash (CF, registered trademark), a flash memory, an SD (Secure Digital) memory card, or the like. Further, the removable recording medium 927 may be, for example, an IC (Integrated Circuit) card or electronic equipment mounting a non-contact IC chip thereon.

The connection port 923 is used to directly connect a device to the microscope control device 20. An example of the connection port 923 includes a USB (Universal Serial Bus) port, an IEEE1394 port, an SCSI (Small Computer System Interface) port, and the like. Other examples of the connection port 923 include an RS-232C port, an optical audio terminal, an HDMI (High-Definition Multimedia Interface) port, and the like. The external connection device 929 is connected to the connection port 923, and thereby the microscope control device 20 directly obtains various kinds of data from the external connection device 929 or provides various kinds of data to the external connection device 929.

The communication device 925 is, for example, a communication interface constituted by a communication device and the like for connection to a communication network 931. The communication device 925 may be, for example, a communication card or the like for a wired or wireless LAN (Local Area Network), Bluetooth (registered trademark), or a WUSB (Wireless USB). In addition, the communication device 925 may be a router for optical communication, a router for ADSL (Asymmetric Digital Subscriber Line), a modem for various kinds of communication, or the like. This communication device 925 can transmit and receive a signal to and from, for example, the Internet or other communication devices, based on a predetermined protocol such as, for example, TCP/IP. In addition, the communication network 931 connected to the communication device 925 is formed by a network or the like connected in a wired or wireless manner, and may be, for example, the Internet, a home LAN, infrared communication, radio wave communication, various kinds of dedicated communication, satellite communication, or the like.

As such, an example of the hardware configuration capable of realizing the function of the microscope control device 20 according to the embodiment has been described. Each of the above-described constituent elements may be constituted using general members, or may be constituted by hardware specific to the function of each constituent element. Therefore, a hardware configuration to be used may be appropriately modified according to the technical level at the time when the embodiment is practiced.

CONCLUSION

As described above, in the microscope control device 20 according to the embodiment, when a defocus amount and a shape of an observed surface of a sample in an entire range are instantly obtained based on phase contrast images, correction for the optical distortion called a distortion is not directly performed for an input image but is performed by performing the offset process for a phase contrast plane observed when a target on the plane is observed, with respect to a phase contrast plane detected when an arbitrary target is observed. Thereby, it is possible to exclude influence where a calculated defocus amount is distorted due to the distortions of the optical system with very little calculation load.

Although the preferred embodiments have been described with reference to the accompanying drawings, the present application is not limited to the embodiments. It is understood by those skilled in the art that various modifications and alterations apparently occur within the scope of the appended claims, and they are naturally included in the technical scope.

For example, in the embodiments, although the case where the correction process for optical distortions according to the embodiments is performed by the microscope control device 20, the present application is not limited to the example. For example, the correction process for optical distortions according to the embodiments may be performed by the microscope itself.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A camera control device comprising:
   an imaging processing unit configured to output phase contrast images recorded by a camera, the phase contrast images being derived from an image of a same perspective of a sample;
   an offset processing unit configured to correct phase contrast information regarding a phase contrast between the corresponding phase contrast images by:
     determining a phase contrast between the phase contrast images,
     selecting an offset pattern of a plurality of offset patterns, each offset pattern corresponding to a defocus amount, and
     determining a phase contrast difference as a difference between i) a phase contrast of the selected offset pattern and ii) the phase contrast of the phase contrast images;
   a defocus amount calculation unit configured to calculate a defocus amount of the sample based on the phase contrast difference determined by the offset processing unit;
   a pattern selection unit configured to:
     determine whether the calculated defocus amount fits with the selected offset pattern, and
     responsive to the calculated defocus amount not fitting with the selected offset pattern, select another different offset pattern closer to the calculated defocus amount and cause the offset processing unit to correct the phase contrast information using the other offset pattern; and
   a distortion correction unit configured to output the calculated defocus amount to a driving control unit responsive to the pattern selection unit determining the calculated defocus amount fits with the selected offset pattern,
   wherein the offset processing unit is configured to determine the phase contrast information based on a parallax between the corresponding phase contrast images derived from the image of the same perspective.

2. The camera control device according to claim 1, wherein an offset process by the offset processing unit is a process for subtracting the offset information from the phase contrast information.

3. The camera control device according to claim 1, wherein the offset patterns include reference offset information used as a reference in an offset process and a plurality of pieces of offset information set for respective defocus amounts of the sample,
   wherein the offset processing unit performs the offset process for the phase contrast information on the basis of the reference offset information,
   wherein the defocus amount calculation unit calculates the defocus amount on the basis of the phase contrast information after offset correction based on the reference offset information, and
   wherein the offset processing unit performs the offset process for the phase contrast information again by using offset information corresponding to the calculated defocus amount.

4. The camera control device according to claim 1, further comprising a defocus amount correction unit that calculates the thickness of a cover glass covering the sample and corrects the defocus amount on the basis of the calculated thickness of the corresponding cover glass.

5. The camera control device according to claim 1, wherein the offset processing unit is configured to:
   use one of the phase contrast images as a reference image and another one of phase contrast images as a comparative image, the reference image and the comparative image being recorded at substantially the same time;
   partition the reference image into sub-regions;
   search the comparative image for image sub-regions matching with each sub-region of the reference image; and
   determine the phase contrast information between the phase contrast images as parallax between the comparative image and the reference image for each matching pair of sub-regions.

6. The camera control device according to claim 5, wherein the offset processing unit is configured to:
   determine a reference offset pattern in a focus state among the offset patterns stored in a database; and
   determine the corrected phase contrast information as a difference between the phase contrast information and the reference offset pattern.

7. The camera control device according to claim 1, further comprising a control unit configured to determine convex and concave properties of the sample based on the phase contrast information.

8. The camera control device according to claim 1, further comprising a storage unit configured to store the plurality of offset patterns.

9. The camera control device according to claim 1, wherein the driving control unit is configured to adjust a focusing mechanism based on the calculated defocus amount.

10. An optical distortion correction method comprising:
    outputting phase contrast images recorded by a camera, the phase contrast images being derived from an image of a same perspective of a sample;
    correcting phase contrast information regarding a phase contrast between the corresponding phase contrast images by:
      determining a phase contrast between the phase contrast images,
      selecting an offset pattern of a plurality of offset patterns, each offset pattern corresponding to a defocus amount, and
      determining a phase contrast difference as a difference between i) a phase contrast of the selected offset pattern and ii) the phase contrast of the phase contrast images; and
    calculating a defocus amount of the sample based on the phase contrast information difference;
    determining whether the calculated defocus amount fits with the selected offset pattern;
    responsive to the calculated defocus amount not fitting with the selected offset pattern, selecting another different offset pattern closer to the calculated defocus amount and cause the offset processing unit to correct the phase contrast information using the other offset pattern; and
    outputting the calculated defocus amount to a driving control unit responsive to determining the calculated defocus amount fits with the selected offset pattern,
    wherein the phase contrast information is determined based on a parallax between the corresponding phase contrast images derived from the same perspective.

11. A camera controlling apparatus comprising:
    a processor; and
    a memory device configured to store instructions, which when executed by the processor, cause the processor to:
      output phase contrast images recorded by a camera, the phase contrast images being derived from an image of a same perspective of a sample, correct phase contrast information regarding a phase contrast between the corresponding phase contrast images by:
  determining a phase contrast between the phase contrast images,
  selecting an offset pattern of a plurality of offset patterns, each offset pattern corresponding to a defocus amount, and
  determining a phase contrast difference as a difference between i) a phase contrast of the selected offset pattern and ii) the phase contrast of the phase contrast images;
calculate a defocus amount of the sample based on the phase contrast difference;
determine whether the calculated defocus amount fits with the selected offset pattern;
responsive to the calculated defocus amount not fitting with the selected offset pattern, select another different offset pattern closer to the calculated defocus amount and correct the phase contrast information using the other offset pattern; and
output the calculated defocus amount to a driving control unit responsive to determining the calculated defocus amount fits with the selected offset pattern,
wherein the phase contrast information is determined based on a parallax between the corresponding phase contrast images derived from the image of the same perspective.

12. The camera controlling apparatus according to claim 11, further comprising a storage device configured to store the plurality of offset patterns.

13. A microscope system comprising:
a first camera configured to record an enlarged image of a sample;
a second camera configured to record phase contrast images corresponding to the enlarged image, the phase contrast images being derived from an image of a same perspective of the sample; and
a camera control device comprising:
  a processor; and
  a memory device configured to store instructions, which when executed by the processor, cause the processor to:
    correct phase contrast information regarding a phase contrast between the corresponding phase contrast images by:
      determining a phase contrast between the phase contrast images,
      selecting an offset pattern of a plurality of offset patterns, each offset pattern corresponding to a defocus amount, and
      determining a phase contrast difference as a difference between i) a phase contrast of the selected offset pattern and ii) the phase contrast of the phase contrast images;
    calculate a defocus amount of the sample based on the phase contrast difference;
    determine whether the calculated defocus amount fits with the selected offset pattern;
    responsive to the calculated defocus amount not fitting with the selected offset pattern, select another different offset pattern closer to the calculated defocus amount and correct the phase contrast information using the other offset pattern; and
    output the calculated defocus amount to a driving control unit responsive to determining the calculated defocus amount fits with the selected offset pattern,
  wherein the phase contrast information is determined based on a parallax between the corresponding phase contrast images derived from the image of the same perspective.

14. The microscope system according to claim 13, further comprising a storage device configured to store the plurality of offset patterns.

15. The microscope system according to claim 13, wherein the instructions further cause the processor to calculate the thickness of a cover glass covering the sample and correct the defocus amount on the basis of the calculated thickness of the corresponding cover glass.

16. The microscope system according to claim 13, further comprising a stage for the sample, wherein the instructions further cause the processor to drive the stage in accordance with the calculated defocus amount.

* * * * *